United States Patent
Sogabe

(10) Patent No.: US 8,303,386 B2
(45) Date of Patent: Nov. 6, 2012

(54) BASEBALL GAME PROGRAM, GAME DEVICE, AND GAME CONTROL METHOD INCLUDING PROPERTY INDICATOR

(75) Inventor: Daisuke Sogabe, Osaka (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 737 days.

(21) Appl. No.: 12/340,149

(22) Filed: Dec. 19, 2008

(65) Prior Publication Data

US 2009/0181771 A1 Jul. 16, 2009

(30) Foreign Application Priority Data

Jan. 11, 2008 (JP) .................................. 2008-003810

(51) Int. Cl.
*A63F 9/24* (2006.01)
(52) U.S. Cl. ..................... 463/2; 463/3; 463/38; 463/50
(58) Field of Classification Search .................. 463/2, 3, 463/38, 50
See application file for complete search history.

(56) References Cited

U.S. PATENT DOCUMENTS

| | | | | |
|---|---|---|---|---|
| 7,137,891 | B2* | 11/2006 | Neveu et al. | 463/31 |
| 2001/0011034 | A1* | 8/2001 | Sogabe | 463/1 |
| 2002/0016194 | A1* | 2/2002 | Namba et al. | 463/3 |
| 2002/0173350 | A1* | 11/2002 | Kaneda | 463/3 |
| 2004/0235565 | A1* | 11/2004 | Shiozawa | 463/32 |
| 2009/0061972 | A1* | 3/2009 | Tipping et al. | 463/6 |
| 2010/0099473 | A1* | 4/2010 | Ikejiri et al. | 463/3 |

FOREIGN PATENT DOCUMENTS

| | | | |
|---|---|---|---|
| JP | 2001-104640 A | | 4/2001 |
| JP | 2006-255175 A | | 9/2006 |
| JP | 2006255175 A | * | 9/2006 |
| JP | 3894937 B2 | | 12/2006 |

OTHER PUBLICATIONS

Pawapurokun Pocket 9 Official Guide Complete Edition, Feb. 21, 2007, p. 028, Konami Digital Entertainment Co., Ltd., Japan.
"ProYakyu Spirits 4", Dengeki PlayStation, vol. 386, Apr. 27, 2007, p. 50-53, Media Works, Japan.
"Baseball Heroes 3", Dengeki Arcade Card Game vol. 4, Nov. 2, 2007, p. 72-74, Media Works, Japan.

* cited by examiner

*Primary Examiner* — N Drew Richards
*Assistant Examiner* — John P Dulka
(74) *Attorney, Agent, or Firm* — Global IP Counselors, LLP

(57) ABSTRACT

The present invention is related to controlling a video game in which ability of a game character is adjusted on the basis of events in the video game. For example, in a baseball video game, if the game player operating a pitcher character keeps selecting a pitching trajectory that a batter character is bad at hitting the ball object, the extent that the batter character is bad at hitting the ball object in the pitching trajectory will be gradually reduced. Therefore, it becomes difficult for the pitcher character to make the batter character out. Accordingly, advantageous level for the pitcher character will be reduced. Therefore, imbalance of the baseball video game is to be solved between the pitcher character and the batter character.

9 Claims, 9 Drawing Sheets

| m | V(m) | DT( V(m) ) |
|---|---|---|
| 1 | 105 | DT0 or DT(105) |
| 2 | 110 | DT0 or DT(110) |
| 3 | 115 | DT0 or DT(115) |
| 4 | 120 | DT0 or DT(120) |
| 5 | 125 | DT0 or DT(125) |
| 6 | 130 | DT0 or DT(130) |
| 7 | 135 | DT0 or DT(135) |
| 8 | 140 | DT0 or DT(140) |
| 9 | 145 | DT0 or DT(145) |
| 10 | 150 | DT0 or DT(150) |

FIG. 3

| n | BT(n) | DT( BT(n) ) | REMARKS |
|---|---|---|---|
| 1 | 105 | DT(105) | SLOW BALL |
| 2 | 120 | DT(120) | CURVEBALL, SCREWBALL |
| 3 | 150 | DT(150) | FAST BALL |

FIG. 4

| ih(m) | DW( ih(m) ) |
|---|---|
| 1 | 1.0 |
| 2 | 1.3 |
| 3 | 1.5 |
| 4 | 1.8 |
| 5 | 1.9 |
| EQUAL TO OR GREATER THAN 6 | 2.0 |

FIG. 6

BASEBALL GAME PROGRAM, GAME DEVICE, AND GAME CONTROL METHOD INCLUDING PROPERTY INDICATOR

CROSS-REFERENCE TO RELATED APPLICATIONS

This application claims priority under 35 U.S.C. §119 to Japanese Patent Application No. 2008-003810 filed on Jan. 11, 2008. The entire disclosure of Japanese Patent Application No. 2008-003810 is hereby incorporated herein by reference.

BACKGROUND OF THE INVENTION

Field of the Invention

The present invention generally relates to a game program, and more specifically to a game program for realizing a game of causing a character to release a moving object. In addition, the present invention relates to a game device allowed to execute the game program, and a game control method controlled by a computer based on the game program.

A variety of video games have been conventionally proposed. The video games are executed in a game device. For example, a game device generally includes a monitor, a game console, and an input unit (e.g., a game controller). Here, the game console is provided separately from the monitor. The input unit is provided separately from the game console. A plurality of input buttons are arranged on the game controller. Also, a portable game device includes a game console, a liquid-crystal display (LCD) monitor, and input units (e.g., a plurality of input buttons). In this case, the LCD monitor is arranged in the approximately center part of the game console. The input units are arranged on the both sides of the LCD monitor.

There are various types of baseball video games. For example, in some baseball video games, a game player selects a baseball team and operates baseball player characters of the selected team by operating a game controller. The baseball team selected by the game player competes with an opponent team for getting scores. Also, in some baseball video games, a baseball match is automatically performed, and a game player enjoys the match as the manager of a baseball team.

An example of the former typed baseball video game is software for PLAYSTATION® 3, "Pro Yakyu Spirits 4" of Konami Digital Entertainment Co., Ltd. on sale in Apr. 1, 2007. In the baseball video game, when a game player operates a baseball player character with a game controller while one's baseball team takes an offensive/defensive position, the game player is capable of causing a baseball player character to throw/hit a ball object. For example, when a game player operates a pitcher character with the game controller, the game player is required to give the pitcher character a command of releasing the ball object along a desired pitching trajectory through the game controller. In this case, the game player generally selects a pitching trajectory that a batter character is bad at hitting the ball object. Then, when an opponent game player moves a cursor of a bat of the batter character for determining a ball-hitting point, a ball-hitting zone is displayed in a small size in the pitching trajectory that the batter character is bad at hitting the ball object. On the other hand, the ball-hitting zone is displayed in a large size in a pitching trajectory that the batter character is good at hitting the ball object. Based on the information (i.e., the ball-hitting zone's size), the game player operating the pitcher character is capable of distinguishing whether the batter character is good at or bad at hitting the ball object in a pitching trajectory.

In conventional baseball video games, when a game player operates the pitcher character (i.e., a first character), the game player is capable of distinguishing whether or not the batter character (i.e., a second character) is bad at hitting the ball object in a pitching trajectory based on the ball-hitting zone's size. Therefore, a game player tends to often select a pitching trajectory that the batter character is bad at hitting the ball object for the purpose of making the batter character out. In this case, operation of the pitcher character tends to be monotonous. Accordingly, a game player may not feel amused for operating the pitcher character. Also, if the game player operating the pitcher character recognizes a pitching trajectory that the batter character is bad at hitting the ball object, the pitcher character comes to easily make the batter character out. Thus, the game player operating the pitcher character will be in more advantageous position than the other game player operating the batter character.

In order to solve the problem, the following system is installed in the above-mentioned baseball video game. The system reduces the extent that a batter character is bad at hitting the ball object in a pitching trajectory. According to the system, if the game player operating a pitcher character often selects a pitching trajectory that a batter character is bad at hitting the ball object, the extent that the batter character is bad at hitting the ball object in the pitching trajectory will be gradually reduced. Therefore, it becomes difficult for the pitcher character to make the batter character out. Accordingly, advantageous level for the pitcher character will be reduced. In this way, imbalance of the baseball video game is to be solved between the pitcher character and the batter character.

Thus, the system is installed in the conventional baseball video game for reducing the extent that a batter character is bad at hitting the ball object in a pitching trajectory (i.e., an element that a batter character comes to be used to a pitching trajectory that the batter character is bad at hitting the ball object). Because of this, if a game player operating a pitcher character wants to effectively make a batter character out, the game player is required to give a pitcher character a command of pitching while considering the pitching trajectory.

On the other hand, in the real baseball, a pitcher may make a batter out by changing ball velocity in every pitching. In this case, whether or not the pitcher is capable of making the batter out depends on whether the batter is accustomed to the fast ball or the slow ball. In other words, whether or not the pitcher is capable of making the batter out depends on the batter's adaptability level for velocity of the ball released by the pitcher. As described above, the element that the batter character comes to be used to a pitching trajectory has been installed in the conventional baseball video games. However, the conventional baseball video games do not evaluate the element that the batter character comes to be used to velocity of the ball object released by the pitcher character. Therefore, in the conventional baseball video games, a game player operating the pitcher player has not given the pitcher character a command of pitching while considering velocity of the ball released by the pitcher character. In other words, the game player operating the pitcher character has not been required to give the pitcher character a command of pitching while having a pitcher's feeling in the real baseball.

Accordingly, aspects of the present invention have been created to solve the above-mentioned problems occurring in the conventional practice, and to enable a game player to have a real world's sport player's feeling in a video game by changing a property of a second character in accordance with a property of a moving object to be released by a first character.

SUMMARY OF THE INVENTION

According to a first aspect of the present invention, a game program is for causing a computer to realize the following functions, and the computer is capable of realizing a game for causing a character to release a moving object. The functions are:

(1) A character display function for displaying a first character and a second character on an image display unit.
(2) A character property recognition function for causing a control unit to recognize second character's property data corresponding to a property of the second character.
(3) A character property display function for displaying a property indicator for informing the property of the second character on the image display unit based on the second character's property data.
(4) A moving object property recognition function for causing the control unit to recognize moving object's property data corresponding to a property of the moving object to be released by the first character.
(5) A moving object display function for displaying the moving object released by the first character on the image display unit by causing the control unit to issue a command for causing the first character to release the moving object.
(6) A character property change function for causing the control unit to change the second character's property data based on the moving object's property data after the moving object released by the first character is displayed on the image display unit.
(7) A character property re-recognition function for causing the control unit to re-recognize the changed second character's property data.
(8) A character property redisplay function for redisplaying the property indicator on the image display unit based on the changed second character's property data.

According to the game program, in the character display function, the first character and the second character are displayed on the image display unit with the first character's image data and the second character's image data. In the character property recognition function, the second character's property data corresponding to a property of the second character is recognized by the control unit. In the character property display function, the property indicator for informing the property of the second character is displayed on the image display unit with property indicator's image data based on the second character's property data. In the moving object property recognition function, the moving object's property data corresponding to the property of the moving object to be released by the first character is recognized by the control unit. In the moving object display function, the moving object released by the first character is displayed on the image display unit with the moving object's image data by causing the control unit to issue a command for causing the first character to release the moving object. In the character property change function, the second character's property data is changed by the control unit based on the moving object's property data after the moving object released by the first character is displayed on the image display unit. In the character property re-recognition function, the changed second character's property data is re-recognized by the control unit. In the character property redisplay function, the property indicator is redisplayed on the image display unit with property indicator's image data based on the changed second character's property data.

For example, when a baseball video game is executed with the present game program, a pitcher character and a batter character are displayed on the image display unit with pitcher character's image data and batter character's image data. Then, the batter character's property data is recognized by the control unit. Here, the batter character's property data corresponds to a property of the batter character (e.g., batter character's adaptability with respect to velocity and variation of the ball object). Then, the property indicator for informing a batter character's property is displayed on the image display unit with the property indicator's image data based on the batter character's property data. Then, the ball object's property data corresponding to a property of the ball object to be released by the pitcher character (e.g., velocity or variation of the ball object) is recognized by the control unit. Then, when a command for causing the pitcher character to release the ball object is issued by the control unit, the ball object released by the pitcher character is displayed on the image display unit with the ball object's image data. Then, when the ball object released by the pitcher character is displayed on the image display unit, the batter character's property data is changed by the control unit based on the ball object's property data. Accordingly, the changed batter character's property data is re-recognized by the control unit. Then, the property indicator is redisplayed on the image display unit with the property indicator's image data based on the changed batter character's property data.

In this case, when the ball object released by the pitcher character is displayed on the image display unit, the batter character's property data is changed by the control unit based on the ball object's property data corresponding to velocity or variation of the ball object, for instance. Accordingly, the property indicator is redisplayed on the image display unit with the property indicator's image data based on the changed batter character's property data.

As described above, according to the first aspect of the present invention, when the ball object is released by the pitcher character, it is possible to evaluate the batter character's adaptability with respect to velocity or variation of the ball object depending on velocity or variation of the released ball object. Generally speaking, this means that it is possible to evaluate the second character's (i.e., batter character's) adaptability with respect to the moving object's (i.e., the ball object's) property by setting a second character's property to be changed depending on a property of the moving object released by the first character (i.e., the pitcher character).

Also, it is possible to inform the batter character's adaptability with respect to velocity and variation of the ball object released by the pitcher character and the like by displaying the property indicator on a pitching-to-pitching basis. Also, a game player is capable of judging a condition of the opponent second character's (i.e., the batter character's) adaptability by watching the property indicator displayed on a pitching-to-pitching basis. Also, a game player is capable of giving the pitcher character a command of pitching while judging a condition of the batter character's adaptability, and is capable of acquiring a variety of pitching methods. When a game player is capable of acquiring a variety of pitching methods, the game player is capable of effectively making the batter character out. Accordingly, the game player will reconfirm amusement of the baseball video game. Generally speaking, this means that a game player is capable of effectively acquiring a method of giving the first character a command, and reconfirms amusement of the video game.

Furthermore, according to the present invention, the batter character's adaptability is changed depending on velocity, variation, and the like of the ball object released by the pitcher character. Therefore, a game player will give the pitcher character a command of pitching while considering velocity, variation, and the like of the ball object to be released. Accordingly, a game player is capable of experiencing a feeling of a real baseball pitcher releasing a ball toward a batter in the video game. Generally speaking, this means that a game player is capable of experiencing a feeling of a real world's athlete in the video game.

For example, it is possible to set the property indicator to be a line-shaped velocity indicator. Here, it is possible to set a portion of the property indicator to be thick for associating the thick portion with high adaptability of the batter character (i.e., batter character's accustomed ball velocity). Here, the pitcher character (i.e., game player) is capable of confirming that a batter character hits the ball object with high possibility when the game player gives the pitcher character a command of releasing the ball object at velocity corresponding to the thick portion of the property indicator. In other words, watching the property indicator makes it possible for a game player to preliminarily judge risky velocity of the ball object to be released by the pitcher character (i.e., risky portion of the property indicator).

A second aspect of the present invention relates to the game program of the first aspect. The game program of the second aspect is related to causing a computer to further realize the following function.

(9) A character motion display function for displaying a series of second character's motions on the image display unit by causing the control unit to issue a command for controlling the second character's motion.

According to the game program, in the character motion display function, a series of second character's motions are displayed on the image display unit with the second character's image data by causing the control unit to issue a command for controlling the second character's motion. Also, in the moving object display function, the moving object released by the first character is displayed on the image display unit with the moving object's image data by causing the control unit to issue a command for causing the first character to release the moving object based on an input signal from an input unit.

For example, when a baseball video game is executed with the present game program, a series of batter character's motions are displayed on the image display unit with the batter character's image data by causing the control unit to issue a command for controlling the batter character's motion. Also, the moving object released by the pitcher character is displayed on the image display unit with the moving object's image data by causing the control unit to issue a command for causing the pitcher character to release the moving object based on an input signal from the input unit.

In this case, the batter character's motion is controlled by the control unit, and the pitcher character's motion is controlled based on a game player's command. Specifically, the batter character's motion is controlled based on an artificial intelligence (AI) program while the pitcher character's motion is controlled based on a game player's command.

Therefore, when a game player operates a pitcher character, the game player is capable of grasping adaptability of a batter character controlled by the AI program on a pitching-to-pitching basis by watching the property indicator. Accordingly, the game player is capable of acquiring a pitching method in a match-up game with the AI program. Also, a game player is capable of effectively making the batter character out. Generally speaking, this means that a game player is capable of effectively acquiring a method of giving the first character a command.

Here, the above-mentioned AI program is prepared for causing the control unit to automatically issue a variety of commands in the baseball video game.

A third aspect of the present invention relates to the game program of the first aspect or the second aspect. The game program of the third aspect is related to causing a computer to further realize the following function.

(10) A character property non-display function for causing the control unit to issue a command for clearing the property indicator displayed on the image display unit when the moving object released by the first character is displayed on the image display unit.

According to the game program, in the character property non-display function, the command for clearing the property indicator displayed on the image display unit is issued by the control unit when the moving object released by the first character is displayed on the image display unit.

For example, when a baseball video game is executed with the present game program, a command for clearing the property indicator displayed on the image display unit is issued by the control unit when the ball object released by the pitcher character is displayed on the image display unit.

In this case, when the ball object is released by the pitcher character and the ball object is displayed on the image display unit, display of the property indicator on the image display unit will be prohibited. According to the third aspect, when the ball object is released by the pitcher character, non-display of the property indicator is performed. Thus, a game player is capable of easily viewing the ball object hit by the batter character. Accordingly, a game player is capable of concentrating subsequent play after the ball object is released by the pitcher character. Generally speaking, this means that a game player is capable of concentrating the game by performing non-display of the property indicator when the property indicator is not necessary.

A fourth aspect of the present invention relates to the game program of one of the first to third aspects. The game program of the fourth aspect is for causing a computer to further realize the following function.

(11) A data association function for causing the control unit to execute processing of associating the second character's property data and the moving object's property data.

According to the game program, in the data association function, processing of associating the second character's property data and the moving object's property data is executed by the control unit. Here, in the character property change function, the second character's property data corresponding to the moving object's property data is changed by the control unit after the moving object released by the first character is displayed on the image display unit.

For example, when a baseball video game is performed with the present game program, processing of associating the batter character's property data and the ball object's property data is executed by the control unit. Then, the batter character's property data corresponding to the ball object's property data is changed by the control unit after the ball object released by the pitcher character is displayed on the image display unit.

In this case, it is possible to change the batter character's property data in conjunction with the ball object's property data by causing the control unit to execute processing of associating the batter character's property data and the ball object's property data. Accordingly, a game player operating the pitcher character is required to give the pitcher character a command of pitching while having tension of a real baseball's pitcher. Therefore, a game player is capable of effectively acquiring a pitching method. Generally speaking, this means that a game player is capable of effectively acquiring a method of giving the first character a command.

A fifth aspect of the present invention relates to a game program of one of the first to fourth aspects. The game program of the fifth aspect is related to causing a computer to further realize the following function.

(12) A change frequency recognition function for causing the control unit to recognize change frequency of the second character's property data.

According to the game program, in the change frequency recognition function, change frequency of the second character's property data is recognized by the control unit. Here, the second character's property data is changed by the control unit based on weighted data corresponding to the moving object's property data and change frequency after the moving object released by the first character is displayed on the image display unit.

For example, when a baseball video game is executed with the present game program, change frequency of the batter character's property data is recognized by the control unit. Then, the batter character's property data is changed by the control unit based on the weighted data corresponding to the ball object's property data and change frequency after the ball object released by the pitcher character is displayed on the image display unit.

In this case, the batter character's property data is changed by the control unit based on the weighted data corresponding to change frequency of the ball object's property data and that of the batter character's property data. For example, as change frequency of the batter character's property data is increased, weight for the batter character's property data is increased. Accordingly, the batter character's adaptability for velocity, variation, and the like of the ball object is evaluated.

Thus, the batter character's property data also reflects the change frequency and the weighted data corresponding to it. Accordingly, when the ball object of 150 km/h is released a plurality of times, a portion of the property indicator corresponding to 150 km/h is displayed with thickness greater than that when the ball object of 150 km/h is released only once. Also, when the ball object of 120 km/h is released once after the ball object of 150 km/h is released three times, thickness of the portion of the property indicator corresponding to 150 km/h is not restored to the default thickness but is slightly reduced. In addition, thickness of a portion of the property indicator corresponding to 120 km/h is increased by a predetermined amount corresponding to a single pitch. In this example, thickness of portions of the property indicator corresponding to 150 km/h and 120 km/h are increased, and the property indicator in this condition is displayed on the television monitor 20. Here, thickness of the portion of the property indicator corresponding to 150 km/h is greater than that corresponding to 120 km/h.

Accordingly, it is possible to more realistically evaluate the batter character's adaptability with respect to velocity, variation, and the like of the ball object. Generally speaking, this means that it is possible to more realistically evaluate the second character's property with respect to the moving object's property.

A sixth aspect of the present invention relates to a game program of one of the first to fifth aspects. In the game program of the sixth aspect, second character's property data corresponding to second character's property having a plurality of levels. This is realized in the character property recognition function. In the moving object property recognition function, moving object's property data corresponding to moving object's property having any one of a plurality of levels is recognized by the control unit. In the character property change function, the second character's property data corresponding to the moving object's property data recognized by the control unit is changed by the control unit after the moving object released by the first character is displayed on the image display unit.

For example, when a baseball video game is executed with the present game program, the batter character's property data having a plurality of levels is recognized by the control unit. Here, the batter character's property data corresponds to the batter character's adaptability with respect to velocity, variation, and the like of the ball object. Also, the ball object's property data corresponding to velocity, variation, and the like of the ball object of one of the plurality of levels is recognized by the control unit. Also, the batter character's property data corresponding to the ball object's property data recognized by the control unit is changed by the control unit after the ball object released by the pitcher character is displayed on the image display unit.

In this case, the ball object's property data corresponding to velocity, variation, and the like of the ball object of a predetermined level is recognized by the control unit. Then, the better character's property data corresponding to the ball object's property data of a predetermined level recognized by the control unit is changed by the control unit after the ball object released by the pitcher character is displayed on the image display unit.

Accordingly, it is possible to cause the control unit to change the batter character's property data corresponding to the batter character's adaptability depending on velocity, variation, and the like of the ball object released by the pitcher character. Specifically, when velocity of the ball object released by the pitcher character is 150 km/h, it is possible to change the batter character's property data for enhancing the batter character's adaptability with respect to the ball object of 150 km/h. Generally speaking, this means that it is possible to evaluate the second character's adaptability with respect to the moving object's property. Also, a game player is capable of effectively acquiring a method of giving the first character a command when giving the first character a command while confirming the second character's adaptability by watching the property indicator. Accordingly, a game player is capable of experiencing a feeling of a real world's athlete in the game.

A seventh aspect of the present invention relates to a game program of the sixth aspect. In the game program of the seventh aspect, second character's property data corresponding to the moving object's property data recognized by the control unit is changed by the control unit after the moving object released by the first character is displayed on the image display unit. Then, second character's property data of the rest of the plurality of levels excluding the level of the second character's property data corresponding to the moving object's property data recognized by the control unit is changed by the control unit based on the second character's property data corresponding to the moving object's property data recognized by the control unit. These are realized in the character property change function.

For example, when a baseball video game is executed with the present game program, batter character's property data (i.e., main-property data) corresponding to the ball object's property data recognized by the control unit is changed by the control unit after the ball object released by a pitcher character is displayed on the image display unit. Then, batter character's property data of the rest of the plurality of levels (i.e., sub-property data) excluding the level of the batter character's property data corresponding to the ball object's property data recognized by the control unit is changed by the control unit based on the batter character's main-property data.

In this case, the batter character's main-property data and the batter character's sub-property data are changed by the control unit. Especially, the batter character's sub-property data is changed by the control unit based on the batter character's main-property data. Accordingly, it is possible to change the batter character's property data of a plurality of levels depending on velocity, variation, and the like of the ball object released by the pitcher character.

Specifically, when velocity of the ball object released by the pitcher character is 150 km/h, it is possible to change the batter character's property data for enhancing batter character's adaptability with respect to the ball object of 150 km/h. Also, it is possible to change the batter character's property data for setting the batter character's adaptability with respect to the ball object of any velocity excluding 150 km/h to be lower than the batter character's adaptability with respect to the ball object of 150 km/h.

Generally speaking, this means that it is possible to more realistically evaluate the second character's adaptability with respect to the moving object's property. Also, when giving the first character a command while confirming the second character's adaptability by watching the property indicator, a game player is capable of effectively acquiring a method of giving the first character a command. Accordingly, a game player is capable of experiencing a feeling of a real world's athlete in the game.

An eighth aspect of the present invention relates to the game program of the sixth aspect or the seventh aspect. The game program of the eighth aspect is related to a computer to further realize the following function.

(13) A level setting function for causing the control unit to set all of the levels of the second character's property so as to make the number of levels of the second character's property equal to or greater than the number of levels of the moving object's property.

According to the game program, in the level setting function, all of the levels of the second character's property are set by the control unit so as to make the number of levels of the second character's property equal to or greater than the number of levels of the moving object's property.

For example, when a baseball video game is executed with the present game program, all of the levels of a batter character's property is set for making the number of levels of the batter character's property equal to or greater than the number of levels of the ball object's property.

In this case, a game player is capable of confirming batter character's adaptability with respect to velocity, variation, and the like of the ball object by watching a property indicator, even if arbitrary values are set for velocity, variation, and the like of the ball object released by a pitcher character. Accordingly, a game player is capable of giving a pitcher character a command of pitching while watching the property indicator to be displayed on a pitching-to-pitching basis. Furthermore, a game player is capable of acquiring a variety of pitching methods. Generally speaking, this means that a game player is capable of effectively acquiring a method of giving the first character a command.

A ninth aspect of the present invention relates to the game program of one of the first to eighth aspects. The game program of the ninth aspect is related to causing a computer to further realize the following function.

(14) A moving object property display function for displaying a mark for informing the second character's property data corresponding to the moving object's property data recognized by the control unit on the property indicator.

According to the game program, in the moving object display function, the mark for informing the second character's property data corresponding to the moving object's property data recognized by the control unit is displayed on the property indicator with mark's image data.

For example, when a baseball video game is executed with the present game program, a mark for informing the ball object's property data recognized by the control unit (e.g., ball velocity and variation of breaking ball) is displayed on a property indicator. Note that the ball velocity will be hereinafter used as a representative of the ball object's property data recognized by the control unit. Here, the mark will be displayed on a corresponding portion of the property indicator when the ball velocity is replaced by the batter character's property data.

Thus, when a game player refers to the mark displayed on the property indicator when selecting a pitch before causing a pitcher player to release a ball object, the game player is capable of grasping a batter character's accustomed velocity level by watching the corresponding portion of the property indicator. Also, a game player is capable of simultaneously confirming velocity of a currently selected pitch by watching the same property indicator. Thus, a game player is capable of easily comparing a batter character's accustomed portion (e.g., ball velocity) and a game player's currently selecting portion (e.g., ball velocity). Therefore, a game player is capable of promptly selecting velocity of the ball object released by a pitcher character and the like without any erroneous operation.

A tenth aspect of the present invention relates to a game device. The game device is capable of executing a game for causing a character to release a moving object. The game device includes: character display means for displaying a first character and a second character on an image display unit; character property recognition means for causing a control unit to recognize second character's property data corresponding to a property of the second character; character property display means for displaying a property indicator for informing the property of the second character on the image display unit based on the second character's property data; moving object property recognition means for causing the control unit to recognize moving object's property data corresponding to a property of the moving object to be released by the first character; moving object display means for displaying the moving object released by the first character on the image display unit by causing the control unit to issue a command for causing the first character to release the moving object; character property change means for causing the control unit to change the second character's property data based on the moving object property data after the moving object released by the first character is displayed on the image display unit; character property re-recognition means for causing the control unit to re-recognize the changed second character's property data; and character property redisplay means for redisplaying the property indicator on the image display unit based on the changed second character's property data.

An eleventh aspect of the present invention relates to a game control method. The game control method is executed by a computer being capable of realizing a game for causing a character to release a moving object. The game control method includes the steps of: displaying a first character and a second character on an image display unit; causing a control unit to recognize second character's property data corresponding to a property of the second character; displaying a property indicator for informing the property of the second character on the image display unit based on the second character's property data; causing the control unit to recognize moving object's property data corresponding to a property of the moving object to be released by the first character; displaying the moving object released by the first character on the image display unit by causing the control unit to issue a command for causing the first character to release the moving object; causing the control unit to change the second character's property data based on the moving object's property data after the moving object released by the first character is displayed on the image display unit; causing the control unit to re-recognize the changed second character's property data; and redisplaying the property indicator on the image display unit based on the changed second character's property data.

As described above, according to the present invention, the second character's property is changed depending on the property of the moving object to be released by the first character, and the second character's adaptability with respect to the moving object's property is accordingly evaluated. Also, according to the present invention, a game player is capable of effectively acquiring a method of giving the first character a command, and will reconfirm amusement of the game. Furthermore, a game player is also capable of having an athlete's feeling of the real world in the game.

BRIEF DESCRIPTION OF THE DRAWINGS

Referring now to the attached drawings which form a part of this original disclosure:

FIG. 3 is a table for illustrating relations among levels, velocity, and velocity adaptability data;

FIG. 4 is a table for illustrating relations among levels, velocity data of a ball object, and velocity adaptability data;

FIG. 6 is a table for illustrating relations between change-frequency data and weighted data;

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Configuration and Operation of Game Device

Figure 1:
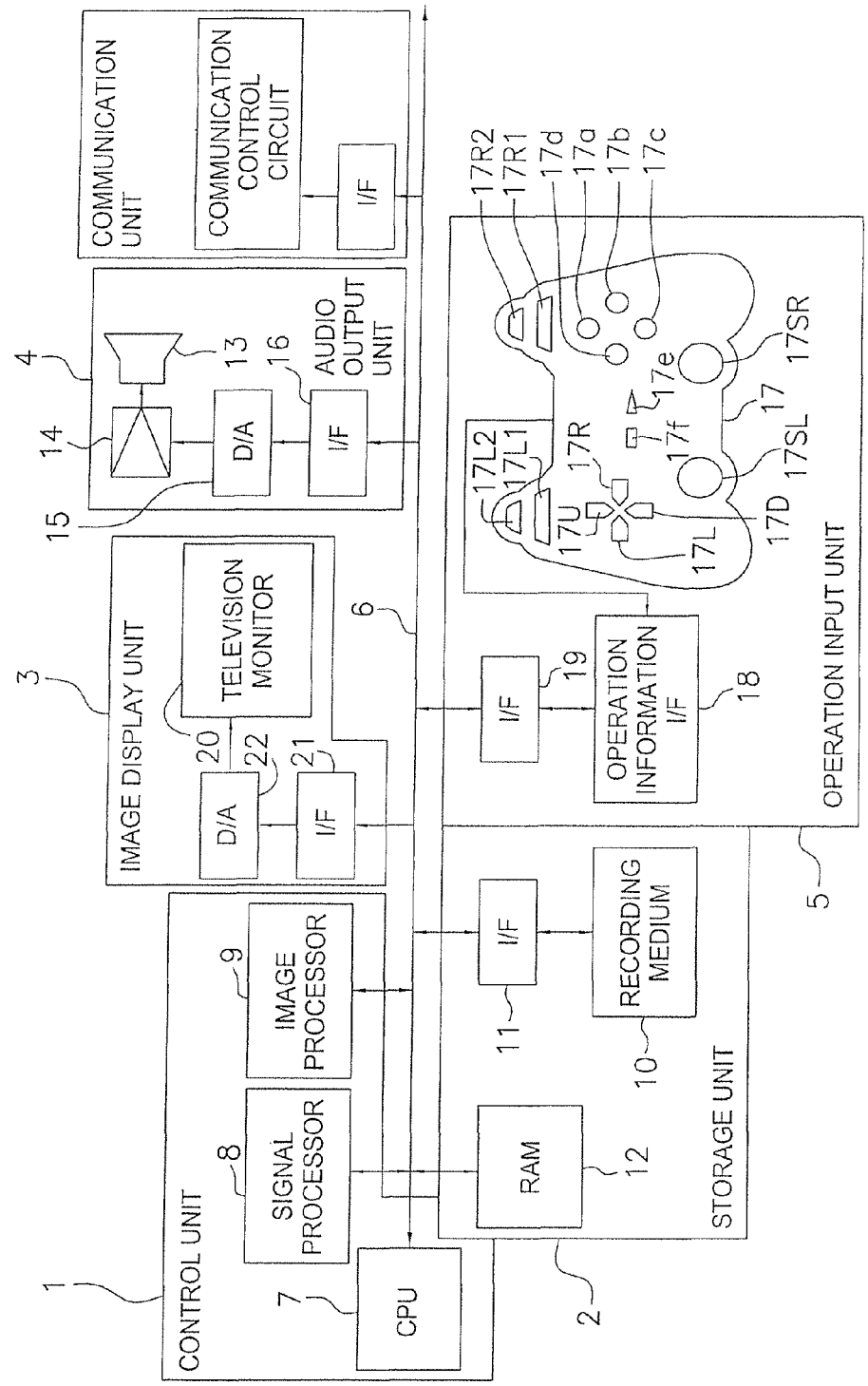
FIG. 1 is a block diagram for illustrating a basic configuration of a video game device in accordance with an embodiment of the present invention.

FIG. 1 illustrates the basic configuration of a game device in accordance with an embodiment of the present invention. As an example of a video game device, a home video game device will be hereinafter explained. The home video game device includes a home video game console and a home television set. A recording medium 10 is configured to be allowed to be loaded in the home video game console. Game data is arbitrarily read out of the recording medium 10 and a game is executed. The content of the game executed herewith is displayed on the home television set.

The game system of the home video game device is made up of a control unit 1, a storage unit 2, an image display unit 3, an audio output unit 4, and an operation input unit 5. These units are connected to each other through a bus 6, respectively. This bus 6 includes an address bus, a data bus, a control bus, and the like. Here, the control unit 1, the storage unit 2, the audio output unit 4, and the operation input unit 5 are included in the home video game console of the home video game device, and the image display unit 3 is included in the home television set.

The control unit 1 is provided for mainly controlling the progress of the entire game based on the game program. For example, the control unit 1 is made up of a CPU (Central Processing Unit) 7, a signal processor 8, and an image processor 9. The CPU 7, the signal processor 8, and the image processor 9 are connected to each other through the bus 6. The CPU 7 interprets a command from a game program and executes a variety of data processing and data control. For example, the CPU 7 commands the signal processor 8 to provide the image data to the image processor. The signal processor 8 mainly executes computations in the three-dimensional space, position conversion computations from the three-dimensional space to a virtual three-dimensional space, light source computation processing, and data generation and data processing of image data and audio data. The image processor 9 mainly executes processing of writing image data on a RAM (Random Access Memory) 12 based on the computation results and processing results of the signal processor 8. Note that the image data written in the RAM 12 will be subsequently rendered.

The memory unit 2 is provided mainly for storing the program data, various types of data used for the program data, and the like. For example, the storage unit 2 is made up of the recording medium 10, an interface circuit 11, and the RAM 12, for instance. The interface circuit 11 is connected to the recording medium 10. The interface circuit 11 and the RAM 12 are connected through the bus 6. The recording medium 10 stores program data of the operation system, game data made up of image data, audio data, and various types of program data, and the like. For example, the recording medium 10 is a ROM (Read Only Memory) cassette, an optical disk, a flexible disk, or the like. The program data of the operating system, the game data, and the like are stored in this recording medium 10. Note that a card memory is also included in the category of the recording medium 10. The card memory is mainly used for storing various game parameters at the point of interruption of the game. The RAM 12 is used for temporarily storing various types of data read out of the recording medium 10, and for temporarily recording the processing results of the control unit 1. The RAM 12 stores address data as well as various types of data. Note that the address data indicates the memory location of various types of data. The RAM 12 is configured to be allowed to specify an arbitrary address and read/write data from/onto the address.

The image display unit 3 is provided for mainly outputting various types of image data as an image. For example, the various types of image data include the image data written onto the RAM 12 by the image processor 9 and the image data read out of the recording medium 10. For example, the image display unit 3 is made up of a television monitor 20, an interface circuit 21, a D/A converter (Digital-to-Analog converter) 22. The D/A converter 22 is connected to the television monitor 20, and the interface circuit 21 is connected to the D/A converter 22. In addition, the bus 6 is connected to the interface circuit 21. Here, the image data is provided to the D/A converter 22 through the interface circuit 21, and is converted into an analog image signal in the D/A converter 22. Then, the analog image signal is outputted to the television monitor 20 as an image.

Here, the image data includes polygon data, texture data, and the like. The polygon data is the coordinate data of vertices forming a polygon. The texture data is used for setting texture with respect to the polygon. The texture data is made up of texture specifying data and texture color data. The texture specifying data is used for associating the polygon and the texture, and the texture color data is used for specifying the texture color. Here, the polygon data and the texture data are associated with polygon address data and texture address data, respectively. The polygon address data and the texture address data include storage locations of the polygon data and the texture data, respectively. As to the image data of this type, the signal processor 8 performs coordinate conversion and perspective projection conversion with respect to the polygon data in the three-dimensional space (i.e., the three-dimensional polygon data) specified by the polygon address data based on the displacement data and the rotation amount data of the screen itself (i.e., point of sight). Accordingly, the polygon data is converted into the polygon data in the two-dimensional space (i.e., the two-dimensional polygon data). Then, a polygon outline is constituted with a plurality of two-dimensional polygon data, and texture data specified by the texture address data is written onto the internal area of the polygon. Thus, it is possible to express a variety of objects (i.e., characters) made by applying texture to each polygon.

The audio output unit 4 is provided mainly for outputting the audio data read out of the recording medium 10 as audio. For example, the audio output unit 4 is made up of a speaker 13, an amplifier circuit 14, a D/A converter 15, and an interface circuit 16. The amplifier circuit 14 is connected to the speaker 13. The D/A converter 15 is connected to the amplifier circuit 14. The interface circuit 16 is connected to the D/A converter 15. In addition, the bus 6 is connected to the interface circuit 16. Here, the audio data is provided to the D/A converter 15 through the interface circuit 16 and is converted into an analog audio signal. The analog audio signal is amplified by the amplifier circuit 14, and is outputted from the speaker 13 as audio. For example, ADPCM (Adaptive Differential Pulse Code Modulation) data, PCM (Pulse Code Modulation) data, and the like are included in the category of the audio data. In the case of the ADPCM data, it is possible to output the audio from the speaker 13 with almost the same type of the above-mentioned processing method. In the case of the PCM data, if the PCM data is converted into the ADPCM data in the RAM 12, it is possible to output the audio from the speaker 13 with almost the same type of the above-mentioned processing method.

The operation input unit 5 is mainly made up of a controller 17, an operation information interface circuit 18, and an interface circuit 19. The operation information interface circuit 18 is connected to the controller 17, and the interface circuit 19 is connected to the operation information interface circuit 18. In addition, the bus 6 is connected to the interface circuit 19.

The controller 17 is an operation unit used by the video game player (user) for the purpose of inputting various operation commands, and transmits operation signals to the CPU 7 according to the video game player's operation. The controller 17 is provided with a first button 17a, a second button 17b, a third button 17c, a fourth button 17d, an up key 17U, a down key 17D, a left key 17L, a right key 17R, a L1 button 17L1, a L2 button 17L2, a R1 button 17R1, a R2 button 17R2, a start button 17e, a select button 17f, a left stick 17SL, and a right stick 17SR.

For example, the up key 17U, the down key 17D, the left key 17L, and the right key 17R are used for providing the CPU 7 with a command to cause the characters and a cursor to move up, down, left, and right on the screen of the television monitor 20.

For example, the start button 17e is used for commanding the CPU 7 to load the game program from the recording medium 10.

For example, the select button 17f is used for commanding the CPU 7 to execute various selections with respect to the game program loaded from the recording medium 10.

The left stick 17SL and the right stick 17SR are stick-shaped controllers with approximately the same configuration as a so-called joystick. This stick-shaped controller includes an upright stick. The stick is configured to be allowed to lean from the upright position to 360-degree directions including front, back, left, and right directions, centering around the fulcrum. The left and right sticks 17SL and 17SR respectively transmit their positional information as an operation signal to the CPU 7 through the operation information interface circuit 18 and the interface circuit 19. Here, their upright positions are defined as the origin of the x-y coordinate, and their positions are accordingly expressed with values in the x-y coordinate. When the left and right sticks 17SL and 17SR are leaned, their positions are determined depending on their leaned directions and angles.

Various functions are allocated to the first button 17a, the second button 17b, the third button 17c, the fourth button 17d, the L1 button 17L1, the L2 button 17L2, the R1 button 17R1, and the R2 button 17R2 depending on the game program to be loaded from the recording medium 10.

Here, excluding the left and right sticks 17SL and 17SR, the buttons and the keys provided in the controller 17 are configured to function as ON/OFF switches. Specifically, they are switched to an on-state when pressed from the neutral position by the external pressure. On the other hand, when the pressure is released, they return to the neutral positions and are switched to an off-state.

The general operations of the above-configured home video game device will be hereinafter explained. When a power switch (not illustrated in the figure) is turned on and the game system 1 is powered on, the CPU 7 reads out image data, audio data, and program data from the recording medium 10 based on the operating system stored in the recording medium 10. All or part of the read-out data including the image data, the audio data, and the program data are stored in the RAM 12. Then, the CPU 7 issues commands for data stored in the RAM 12 (e.g., the image data and the audio data) based on the program data stored in the RAM 12.

In a case of the image data, the signal processor 8 firstly performs a variety of computations (e.g., positional computation and light source computation for a character in the three-dimensional space) based on the command from the CPU 7. Next, the image processor 9 executes a variety of processing (e.g., processing for writing the image data (to be rendered) onto the RAM 12) based on the computation results by the signal processor 8. Then, the image data written onto the RAM 12 is provided to the D/A converter 22 through the interface circuit 21. Here, the image data is converted into an analog image signal by the D/A converter 22. The image data is subsequently provided to the television monitor 20 and is displayed as an image.

In a case of the audio data, the signal processor 8 firstly executes processing to generate and process audio data based on the command from the CPU 7. Here, a variety of processing (e.g., pitch conversion, noise addition, envelope setting, level setting, and reverb addition) are executed for the audio data. Next, the audio data is outputted from the signal processor 8, and is provided to the D/A converter 15 through the interface circuit 16. Here, the audio data is converted into an analog audio signal. Then, the audio data is outputted as the audio from the speaker 13 through the amplifier circuit 14.

Summary of Various Processing in Game Device

Figure 2:
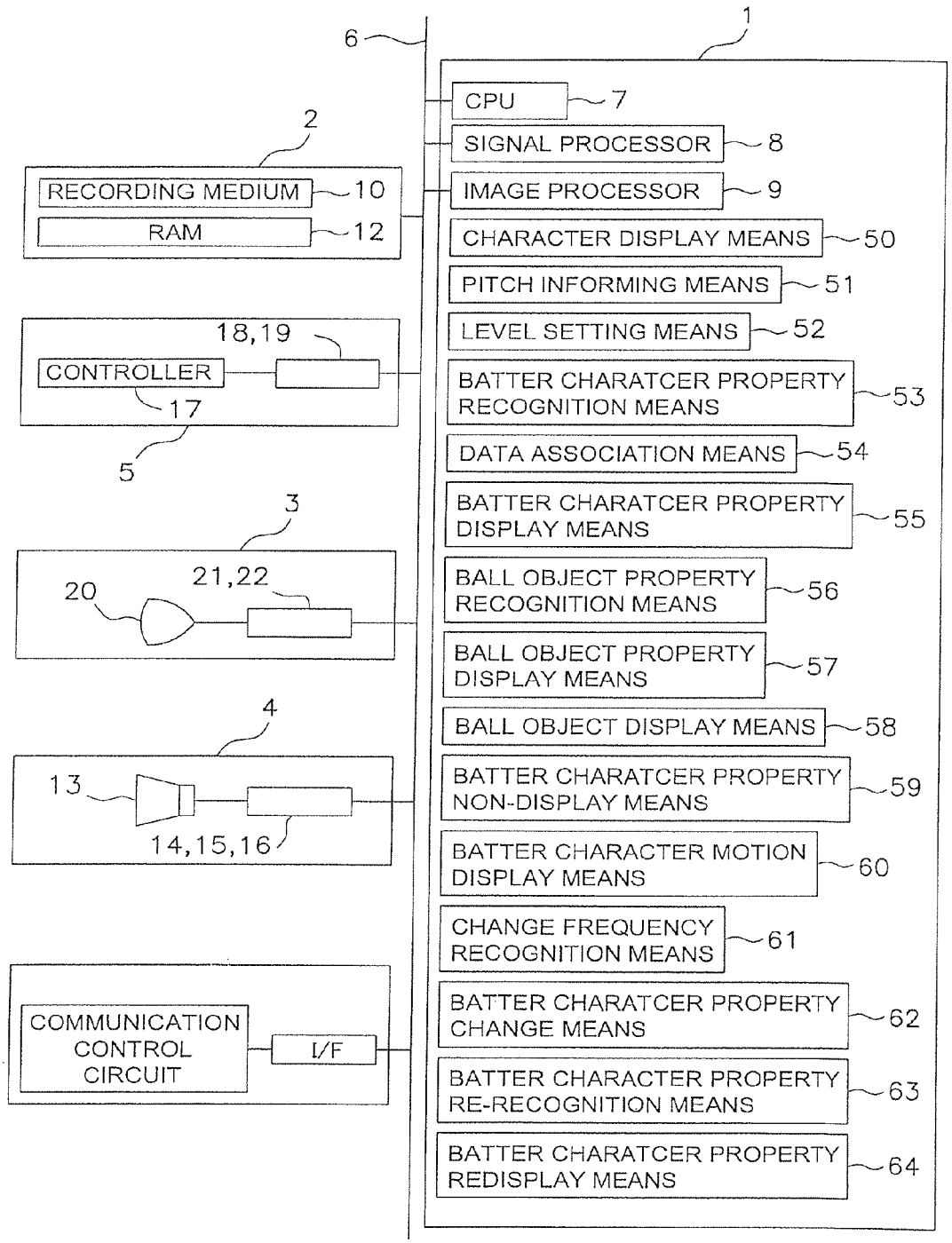
FIG. 2 is a functional block diagram for illustrating an example of the video game device.

For example, a baseball video game is executed in the present game console. The present game console is configured to realize a game for causing a pitcher character to release a ball object. FIG. 2 is a functional block diagram for explaining functions playing major roles in the present invention.

Character display means 50 has a function of displaying a pitcher character and a batter character on the television monitor 20.

In the character display means 50, a pitcher character and a batter character are displayed on the television monitor 20 with character's image data. For example, in the character display means 50, pitcher character's image data and pitcher character's position coordinate data are recognized by the CPU 7. Here, the pitcher character's image data and the pitcher character's position coordinate data are stored in the RAM 12. Also, batter character's image data and batter character's position coordinate data are recognized by the CPU 7. Here, the batter character's image data and the batter character's position coordinate data are stored in the RAM 12. Then, based on a command of the CPU 7, the pitcher character's image data and the batter character's image data are provided to the television monitor 20 through the image processing circuit 14. Accordingly, the pitcher character and the batter character are respectively displayed on predetermined positions (i.e., the pitcher's mound for the pitcher character and the batter's box for the batter character) based on the pitcher character's position coordinate data and the batter character's position coordinate data.

Here, when the game program is loaded, the character's image data and the character's position coordinate data are provided from the recording medium 10 to the RAM 12, and is then stored in the RAM 12.

Pitch informing means 51 has a function of displaying an image for informing a game player of a pitch type that the pitcher character is capable of releasing on the television monitor 20.

In the pitch informing means 51, an image for informing a game player of a pitch that the pitcher character is capable of releasing is displayed on the television monitor 20 with pitch information's image data. Here, based on a command of the CPU 7, the pitch information's image data is provided to the television monitor 20 through the image processing circuit 14. Then, the pitch information's image is displayed on a predetermined position on the television monitor 20 based on the pitch information's position coordinate data. Here, when the game program is loaded, the pitch information's image data and the pitch information's position coordinate data are provided from the recording medium 10 to the RAM 12, and is then stored in the RAM 12.

Level setting means 52 has a function of causing the CPU 7 to set a level of batter character's velocity adaptability. Here, the number of levels of the batter character's velocity adaptability is equal to or greater than the number of levels of the ball object's velocity.

In the level setting means 52, the level of the batter character's velocity adaptability is set by the CPU 7 while the number of levels of the batter character's velocity adaptability is equal to or greater than the number of levels of the ball object's velocity.

Here, "the ball object's velocity" means velocity assigned to each of pitches that the pitcher character is capable of releasing. Also, the number of levels of the ball object's velocity corresponds to the number of kinds (i.e., levels) of the ball object's velocity assigned to each of pitches that the pitcher character is capable of releasing. Here, both of the ball object's velocity and the number of kinds of the ball object's velocity are preliminarily determined in the game program.

For example, when one of pitcher characters is capable of releasing a curveball of 100 km/h, a screwball of 120 km/h, and a fastball of 150 km/h, the number of levels of the ball object's velocity is set to be "3". Also, when another pitcher character is capable of releasing a slow ball of 90 km/h, a curveball of 120 km/h, a screwball of 120 km/h, and a fastball of 150 km/h, the number of pitches is four. However, velocity of the curveball and that of the screwball is the same. Therefore, the number of levels of the ball object's velocity is set to be "3".

The maximum level of the ball object's velocity is set in the game program. The following relation is established between the maximum level of the ball object's velocity and the number of levels of the ball object's velocity: "(the maximum level of the ball object's velocity)≧(the number of levels of the ball object's velocity). Also, the number of levels of the batter character's velocity adaptability is set to be the maximum level of the ball object's velocity. In other words, the following relation is established between the number of levels of the batter character's velocity adaptability and the maximum level of the ball object's velocity: "(the number of levels of the batter character's velocity adaptability)=(the maximum level of the ball object's velocity).

Thus, the condition, "the number of levels of the batter character's velocity adaptability is equal to or greater than the number of levels of the ball object's velocity", is satisfied by setting the number of levels of the batter character's velocity adaptability to be the maximum level of the ball object's velocity.

When the number of levels of the batter character's velocity adaptability is set to be the maximum of the predetermined ball object's velocity, velocity corresponding to each level of the batter character's velocity adaptability (i.e., velocity of each level) is recognized by the CPU 7. Accordingly, the velocity level that the batter character is capable of adapting is set by the CPU 7.

Here, velocity corresponding to each level of the batter character's velocity adaptability (i.e., velocity of each level) is set by the CPU 7 based on velocity of the ball object that the pitcher character is capable of releasing. For example, velocity of each level is set based on the maximum velocity of the ball object that the pitcher character is capable of releasing. Specifically, the maximum velocity of the ball object that the pitcher character is capable of releasing is used as velocity of the maximum level. Also, the maximum velocity is used as a benchmark, and any velocity less than the maximum velocity are used as velocity of the other levels. Accordingly, based on the maximum velocity corresponding to the maximum level, it is possible to cause the CPU 7 to recognize velocity corresponding to the other levels.

Batter character property recognition means 53 has a function of causing the CPU 7 to recognize batter character's property data corresponding to the batter character's velocity adaptability. Specifically, the batter character property recognition means 53 has a function of causing the CPU 7 to recognize the batter character's property data corresponding to multiple-level velocity adaptability of the batter character.

In the batter character property recognition means 53, the batter character property data corresponding to multiple-level velocity adaptability of the batter character is recognized by the CPU 7.

For example, velocity corresponding to each level of the batter character's velocity adaptability (i.e., velocity of each level) is expressed by "V", and the batter character's property data corresponding to multiple-level velocity adaptability of the batter character is expressed by "DT (V)". Thus defined batter character's property data DT (V) of each level is recognized by the CPU 7.

Data association means 54 has a function of causing the CPU 7 to execute processing of associating the batter character's property data with the ball object's property data.

In the data association means 54, processing of associating the batter character's property data with the ball object's property data is executed by the CPU 7.

For example, a level of the ball object's velocity is expressed by "n", and the ball object's property data corresponding to multiple-level velocity of the ball object is expressed by "BT (n)". Here, when the number of levels of the ball object's property data is set to be "n_max", "n" is set to be any of natural number ranging from "1" to "n_max". Processing of associating thus defined ball object's property data BT (n) with the batter character's property data DT (V) is executed by the CPU 7.

Specifically, when the ball object's property data BT (n) is corresponded to the ball object's velocity V, it is possible to evaluate the batter character's property data DT (V) corresponding to the ball object's property data BT (n) with the expression "DT (BT (n))". Thus, the batter character's property data DT (V) and the ball object's property data BT (n) are associated by the CPU 7.

Batter character property display means 55 has a function of displaying a velocity ability indicator on the television monitor 20 based on the batter character's property data. Here, the velocity ability indicator is used for informing a game player of the batter character's velocity adaptability.

In the batter character property display means 55, the velocity ability indicator for informing a game player of the batter character's velocity adaptability is displayed on the television monitor 20 with ability indicator's image data based on the batter character's property data DT (V). For example, the ability indicator's image data is provided to the television monitor 20 through the image processing circuit 14 based on a command of the CPU 7. Accordingly, the velocity ability indicator is displayed on a predetermined position on the television monitor 20 based on ability indicator's position coordinate data. Here, when the game program is loaded, the ability indicator's image data and the ability indicator's position coordinate data are provided from the recording medium 10 to the RAM 12, and is then stored in the RAM 12.

Ball object property recognition means 56 has a function of causing the CPU 7 to recognize the ball object's property data corresponding to velocity of the ball object released by the pitcher character. Specifically, the ball object property recognition means 56 has a function of causing the CPU 7 to recognize the ball object's property data corresponding to any one of the multiple-level velocity of the ball object.

In the ball object property recognition means 56, the ball object's property data corresponding to any one of the multiple-level velocity of the ball object is recognized by the CPU 7.

For example, a game player selects a pitch of the ball object to be released by the pitcher character by operating the controller 17, while watching the pitch information's image displayed on the television monitor 20. Accordingly, the ball object's velocity assigned to the selected pitch (i.e., the ball object's property data) is recognized by the CPU 7.

Ball object property display means 57 has a function of displaying a mark for informing a game player of the batter character's property data corresponding to the ball object's property data recognized by the CPU 7 on the television monitor 20.

In the ball object property display means 57, a mark for informing a game player of the batter character's property data corresponding to the ball object's property data recognized by the CPU 7 is displayed on the television monitor 20 with mark's image data.

For example, when a game player selects a pitch of the ball object to be released by the pitcher character by operating the controller 17, the batter character's property data corresponding to the ball object's property data assigned to the selected pitch is recognized by the CPU 7. Accordingly, the mark for informing a game player of the level of the batter character's property data is displayed on the ability indicator.

Here, the mark's image data is provided to the television monitor 20 through the image processing circuit 14 based on a command of the CPU 7. Accordingly, the mark is displayed on a predetermined position on the television monitor 20 based on mark's position coordinate data. Also, when the game program is loaded, the mark's image data and the mark's position coordinate data are provided from the recording medium 10 to the RAM 12, and are then stored in the RAM 12.

Ball object display means 58 has a function of displaying the ball object released by the pitcher character on the television monitor 20 by causing the CPU 7 to issue a command for causing the pitcher character to release the ball object. Specifically, the ball object display means 58 has a function of displaying the ball object released by the pitcher character on the television monitor 20 by causing the CPU 7 to issue a command for causing the pitcher character to release the ball object based on an input signal from the controller 17.

In the ball object display means 58, when a command for causing the pitcher character to release the ball object is issued by the CPU 7 based on an input signal from the controller 17, the ball object released by the pitcher character is displayed on the television monitor 20.

For example, when a game player operates the controller 17 for giving a command for causing the pitcher character to release the ball object, an input signal is transmitted from the controller 17 to the CPU 7. Then, when the input signal is received by the CPU 7, a command for causing the pitcher character to release the ball object is issued by the CPU 7. Accordingly, a series of pitcher character's motions from the start of a pitching motion to the release of the ball object are displayed on the television monitor 20 based on the command for causing the pitcher character to release the ball object. Then, the ball object released by the pitcher character is displayed on the television monitor 20 with the ball object's image data.

Here, the above-mentioned command for causing the pitcher character to release the ball object includes a variety of commands such as a command for causing the pitcher character to start a pitching motion, a command for determining a pitching trajectory, and a command for causing the pitcher character to release the ball object. These commands are given when a game player operates the controller 17.

Batter character property non-display means 59 has a function of causing the CPU 7 to issue a command for clearing the ability indicator displayed on the television monitor 20 when the ball object released by the pitcher character is displayed on the television monitor 20.

In the batter character property non-display means 59, a command for clearing the ability indicator displayed on the television monitor 20 is issued by the CPU 7 when the ball object released by the pitcher character is displayed on the television monitor 20.

For example, when a command for displaying the ball object on the television monitor 20 is issued by the CPU 7, a command for clearing the ability indicator displayed on the television monitor 20 is issued by the CPU 7. Accordingly, the ability indicator currently displayed on the television monitor 20 is cleared.

Batter character motion display means 60 has a function of displaying a series of swinging motions by a batter character on the television monitor 20 by causing the CPU 7 to issue a command for controlling the batter character's swing motion after the ball object released by the pitcher character is displayed on the television monitor 20.

In the batter character motion display means 60, when the command for causing the batter character to perform a swing motion is issued by the CPU 7 after the ball object released by the pitcher character is displayed on the television monitor 20, a series of swinging motions by the batter character are displayed on the television monitor 20.

For example, when a command for causing the batter character to perform a swing motion is issued by the CPU 7 based on an AI (artificial intelligence) program after a command for displaying the ball object on the television monitor 20 is issued by the CPU 7, a series of swinging motions by the batter character are displayed on the television monitor 20 with batter character's movie data.

Change frequency recognition means 61 has a function of causing the CPU 7 to recognize frequency of changing the batter character's property data.

In the change frequency recognition means 61, frequency of changing the batter character's property data (i.e., change frequency) is recognized by the CPU 7. Here, the change frequency to be recognized by the CPU 7 is set as follows. For example, the default value of the change frequency is set to be "0". The change frequency (i.e., the default value) is recognized by the CPU 7 before after-mentioned batter character property change means 62 is performed. After the after-mentioned batter character property change means 62 is performed, processing of incrementing the change frequency is executed by the CPU 7 and the incremented change frequency is recognized by the CPU 7.

Batter character property change means 62 has a function of causing the CPU 7 to change the batter character's property data to the changed property data based on the ball object's property data after the ball object released by the pitcher character is displayed on the television monitor 20. Specifically, the batter character property change means 62 has a function of causing the CPU 7 to change the batter character's property data corresponding to the ball object's property data recognized by the CPU 7 after the ball object released by the pitcher character is displayed on the television monitor 20.

More specifically, the batter character property change means 62 has a function of causing the CPU 7 to change the batter character's property data (i.e., main-property data) corresponding to the ball object's property data recognized by the CPU 7 in consideration of the weighted data corresponding to the change frequency after the ball object released by the pitcher character is displayed on the television monitor 20. Also, the batter character property change means 62 has a function of causing the CPU 7 to change the batter character's property data of the other levels (sub-property data) excluding the batter character's main-property data, while the batter character's main-property data is used as a benchmark.

In the batter character property change means 62, the batter character's main-property data is changed by the CPU 7 in consideration of the weighted data corresponding to the change frequency after the ball object released by the pitcher character is displayed on the television monitor 20. Then, the batter character's sub-property data is changed by the CPU 7 based on the batter character's main-property data. Here, relation between the change frequency and the weighted data is preliminarily determined in the game program.

Batter character property re-recognition means 63 has a function of causing the CPU 7 to re-recognize the changed batter character's property data.

In the batter character property re-recognition means 63, the changed batter character's property data of each level (i.e., the main-property data and the sub-property data) are re-recognized by the CPU 7.

Batter character property redisplay means 64 has a function of redisplaying the velocity ability indicator for informing the batter character's velocity adaptability on the television monitor 20 based on the changed batter character's property data.

In the batter character property redisplay means 64, the velocity ability indicator for informing the batter character's velocity adaptability is redisplayed on the television monitor 20 with the ability indicator's image data based on the changed batter character's property data of each level (i.e., the main-property data and the sub-property data).

Summary of Ability Informing System in Baseball Video Game

Figure 8:
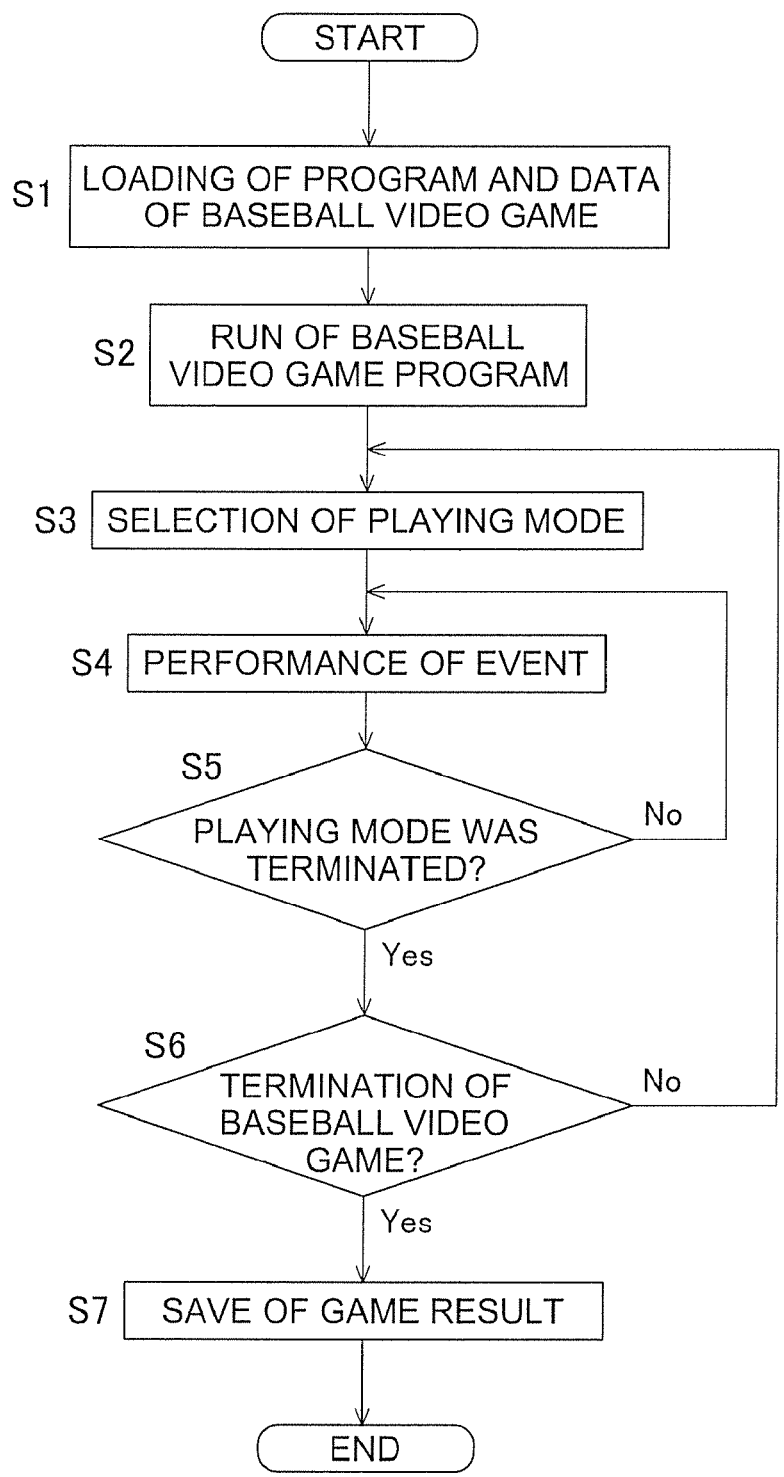
FIG. 8 is a schematic flowchart for illustrating the entire flow of a baseball video game.
Figure 9A:
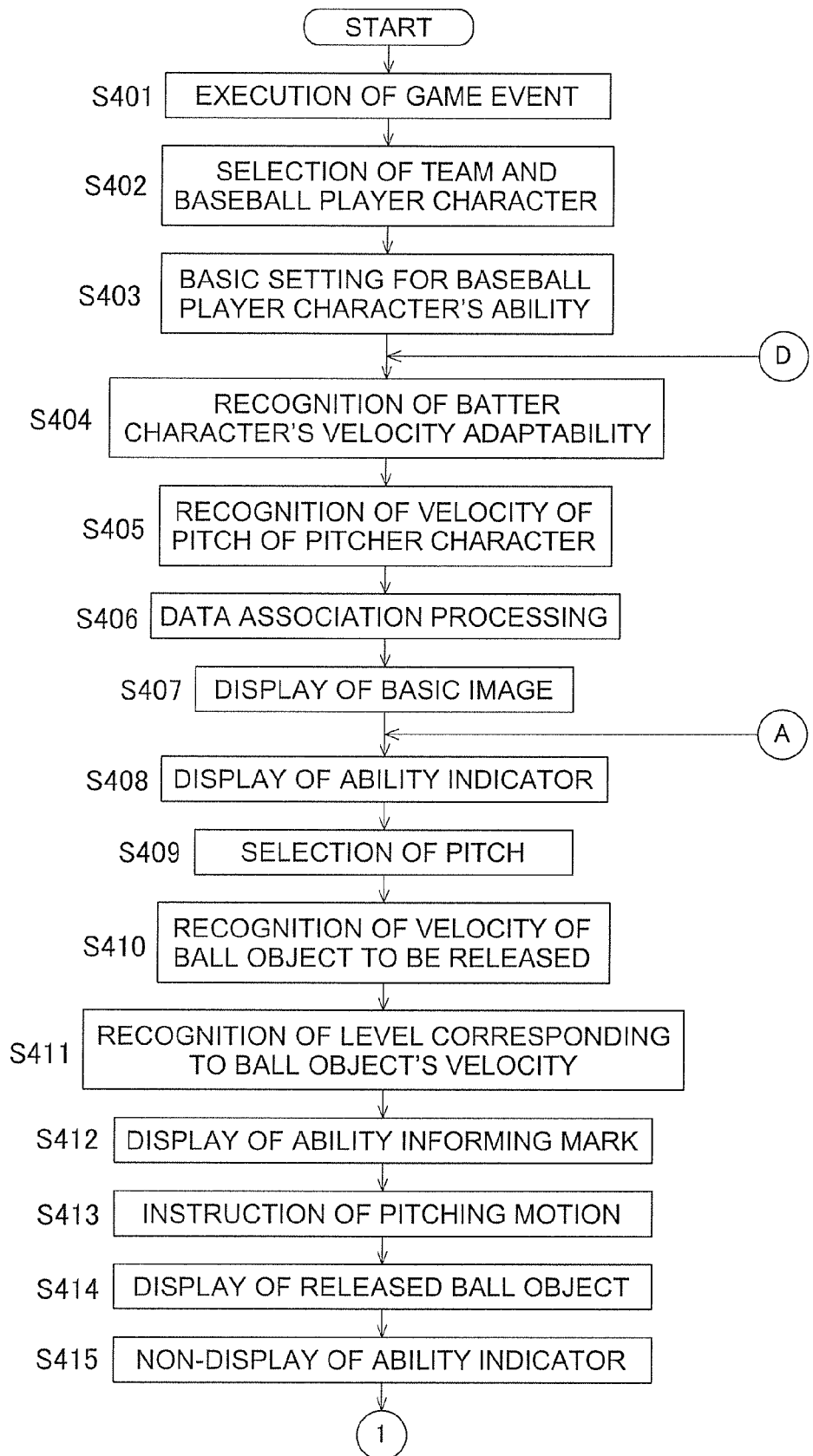
FIG. 9A is a flowchart for illustrating an ability informing system in a baseball video game.
Figure 9B:
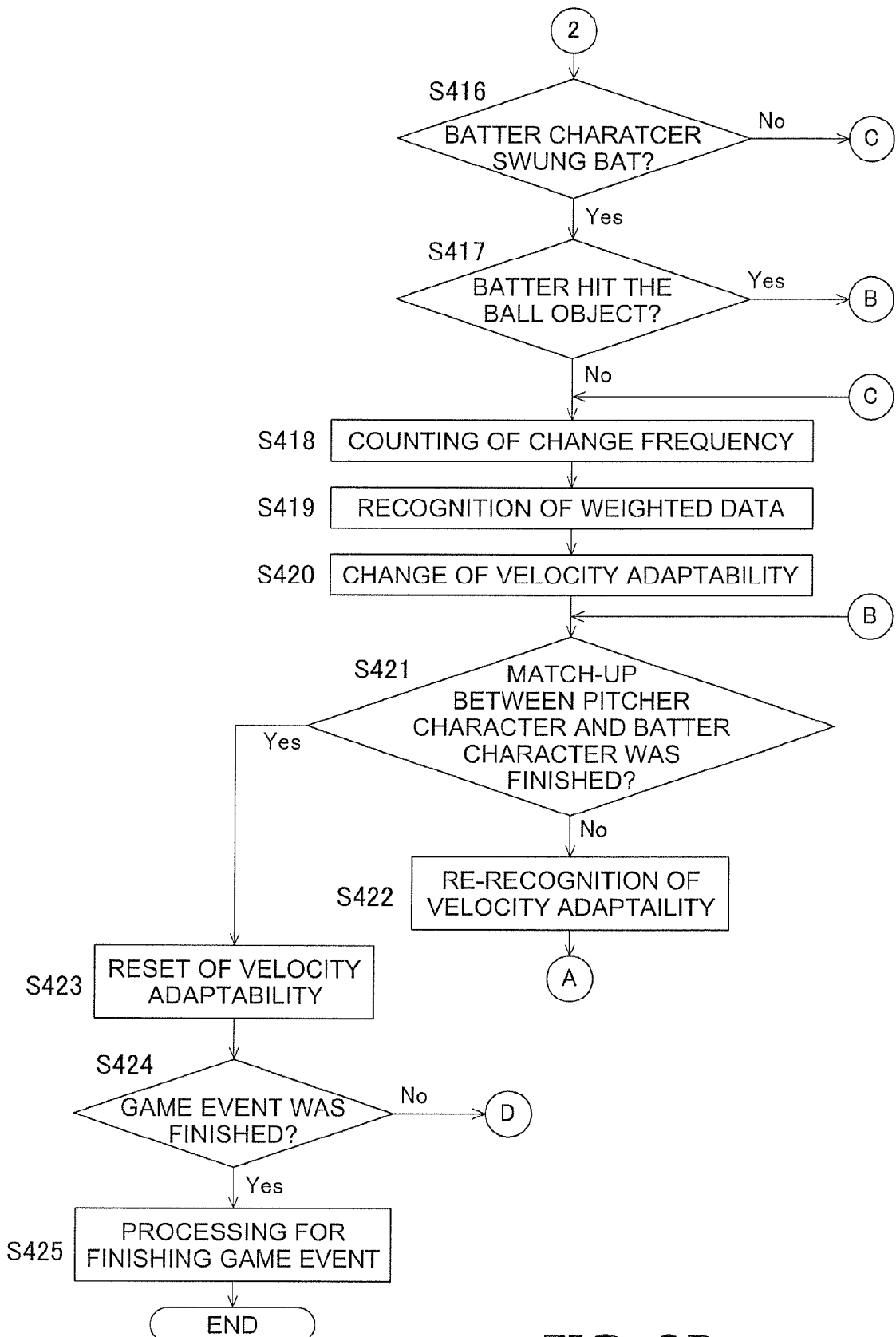
FIG. 9B is a flow chart for illustrating an ability informing system in a baseball video game.

Next, contents of the ability informing system in the baseball video game will be hereinafter specifically explained. In addition, processing flows illustrated in FIGS. 8 and 9 will be explained. FIG. 8 is a processing flow for illustrating the summary of the entire baseball video game. FIG. 9 is a processing flow for explaining the above-mentioned system.

First, when the game console is powered on and is started, a baseball video game program stored in the recording medium 10 is loaded into the RAM 12, and is then stored in the RAM 12. Also, the recording medium 10 stores a variety of basic game data necessary for executing the baseball video game. Here, the variety of basic game data are simultaneously loaded into the RAM 12, and are then stored in the RAM 12 (Step S1).

For example, the basic game data includes a variety of image data for the three-dimensional game space (e.g., image data of baseball stadiums, baseball player characters, and a variety of objects). The variety of image data are recognized by the CPU 7. Also, the basic game data includes position coordinate data for arranging the variety of above-mentioned image data in the three-dimensional game space. Furthermore, the basic game data includes the data to be used for the ability informing system.

Next, the baseball video game program stored in the RAM 12 is executed by the CPU 7 based on the basic game data (Step S2). Accordingly, the start-up screen of the baseball video game is displayed on the television monitor 20. Also, a variety of setting screens are displayed on the television monitor 20 for executing the baseball video game. For example, a mode selection screen (not illustrated in the figure) is displayed on the television monitor 20 for selecting a playing mode of the baseball video game. A game player selects a playing mode through the mode selection screen by operating the controller 17 (Step S3). For example, a match-up mode, a pennant-race mode, and a developing mode are prepared as the playing modes. In the match-up mode, a game player selects one of 12 baseball teams, and enjoys playing a match-up game. In the pennant-race mode, a game player selects one of 12 baseball teams and enjoys playing baseball matches in the pennant race. In the developing mode, a game player develops baseball player characters as a manager of a baseball team.

Next, a variety of events are performed by the CPU 7 in the playing mode selected through the mode selection screen (Step S4). For example, the events include an event automatically controlled by the CPU 7 based on the AI program, and an event manually controlled by a game player based on an input signal from the controller 17. Also, controls of player characters are classified into the automatic control and the manual control. The automatic control automatically gives a baseball player character a command based on the AI program. On the other hand, the manual control directly gives a baseball player character a command based on an input signal from the controller 17. Thus, according to the present baseball video game, an event is controlled and a command is given to a baseball player character in accordance with commands from the controller 17 and the AI program.

Next, it is judged by the CPU 7 whether or not the selected playing mode was terminated (Step S5). Specifically, it is judged by the CPU 7 whether or not a command for indicating the end of the playing mode was issued. If it was judged by the CPU 7 that the command for indicating the end of the playing mode was issued (Yes in Step S5), processing of storing data for continuing the game in the RAM 12 is executed by the CPU 7. After the data for continuing the game is stored in the RAM 12, a selection screen is displayed on the television monitor 20 for selecting whether or not a game player stops playing the baseball video game (Step S6).

Then, if a game player selected an item for stop playing the baseball video game through the selection screen by operating the controller 17 (Yes in Step S6), processing for terminating the baseball video game is executed by the CPU 7 (Step S7). On the other hand, if a game player selected an item for continuing playing the baseball video game through the selection screen by operating the controller 17 (No in Step S6), the mode selection screen in Step S3 is redisplayed on the television monitor 20.

Unless it was judged by the CPU 7 that the command for terminating the playing mode was issued (No in Step S5), a variety of events are performed by the CPU 7 in the playing mode selected through the mode selection screen (Step S4).

Next, the ability informing system will be hereinafter explained in detail.

The following is an example of the ability informing system functioning in the match-up mode. For example, when the match-up mode is selected through the mode selection screen and a game event is executed in the match-up mode, the ability informing system functions. In the match-up mode, a team A is controlled by the AI program and a team B is controlled by a game player. Also, the team A is set to bat first while the team B is set to take the field first. Especially, the following example relates to the ability informing system functioning when the game player gives a command to a pitcher character 70 of the team B.

When a game player selects the match-up mode through the mode selection screen, a game event is performed by the CPU 7 (Step S401). Then, in Step S402, the teams (i.e., teams A and B) are selected through a team selection screen (not illustrated in the figure). In addition, baseball player characters of the both teams (i.e., the teams A and B) are selected through a player selection screen (not illustrated in the figure). Accordingly, the basic settings for determining a variety of abilities of the selected baseball player characters are performed by the CPU 7 (Step S403).

For example, the maximum "n_lim" for a level "n" of the ball object's velocity is set by the CPU 7. Specifically, the maximum n_lim is set to be "10". Here, the maximum n_lim is preliminarily determined in the game program.

Here, "the ball object's velocity" means velocity assigned to a pitch of each pitcher character, that is, velocity assigned to a pitch that each pitcher character is capable of releasing. Therefore, in the present embodiment, the ball object's velocity is treated as one of the pitcher character's abilities.

Also, the number of levels "m_max" of the batter character's velocity adaptability is set by the CPU 7, for instance. Specifically, the number of levels m_max is set to be the maximum n_lim (i.e., 10) by the CPU 7. Accordingly, the level "m" of the batter character's velocity adaptability is set to be any of 10 levels (i.e., levels "1" to "10"). Thus, when the level m of the batter character's velocity adaptability is set, it is possible to constantly set the number of levels m_max of the batter character's velocity adaptability to be equal to or greater than the number of kinds of the ball object's velocity that the pitcher character is capable of releasing (i.e., equal to or greater than the number of levels, n_max) by setting the level m of the batter character's velocity adaptability.

Furthermore, velocity V (m) corresponding to each level m of the batter character's velocity adaptability (i.e., velocity of each level) is set by the CPU 7, for instance. Specifically, velocity V (m) of each level is set based on the maximum velocity V_max of the ball object that each pitcher character is capable of releasing.

Here, the maximum velocity V_max is assigned to the velocity of the maximum level (e.g., velocity V (10) of level 10) by the CPU 7. Also, the maximum velocity V (10) of the ball object is used as a benchmark, and any velocity less than the maximum velocity V (10) (i.e., V_max) are assigned to velocity of the other levels (e.g., velocity V (m) of levels 1 to 9, note that "m" is natural number ranging from 1 to 9) by the CPU 7.

Specifically, when a level of the batter character's velocity adaptability, velocity of each level, and the maximum velocity of the ball object that the pitcher character is capable of releasing, are respectively set to be "m" (m is natural number ranging from 1 to m_max), "V (m)", and "V_max", velocity of each level is calculated based on the equation "V (m)=V_max−α×(10−m)".

Here, "α" is coefficient for regulating velocity corresponding to each level, and is set to be "5.0". Also, the maximum "m_max" for "m" corresponds to the number of levels of the batter character's velocity adaptability. In other words, the following relation is established: "m_max=10".

For example, when the maximum velocity V_max is set to be 150 km/h, the relation between each level and velocity of each level is established as illustrated in FIG. 3.

Next, the property data corresponding to abilities of the selected baseball player character is recognized by the CPU 7. Here, the property data corresponding to the batter character's velocity adaptability (i.e., velocity adaptability data) and velocity data corresponding to velocity of the ball object to be released by the pitcher character are recognized by the CPU 7.

For example, when velocity corresponding to each level of the batter character's velocity adaptability (i.e., velocity of each level) is set to be "V (m)" and the batter character's velocity adaptability data corresponding to multiple-level velocity adaptability of the batter character is set to be "DT (V (m))", the batter character's velocity adaptability data DT (V (m)) of each level stored in the RAM 12 is recognized by the CPU 7 (Step S404).

Here, a predetermined value $DT_0$ is used as the default value of the batter character's velocity adaptability data DT (V (m)) of each level. Here, the following relation is established: "$DT_0$=1.0". Therefore, when a game event is started, the default value $DT_0$ (=1.0) of the batter character's velocity adaptability data of each level is recognized by the CPU 7 as the batter character's velocity adaptability data DT (V (m)) of each level.

Also, when a ball object's velocity level is set to be "n" (n is natural number ranging from 1 to n_max) and the ball object's velocity data corresponding to multiple-level velocity of the ball object is set to be "BT (n)", the velocity data BT (n) stored in the RAM 12 corresponds to velocity of a pitch of the ball object that the pitcher character is capable of releasing. In Step S405, the velocity of a pitch of the ball object that the pitcher character is capable of releasing is recognized by the CPU 7.

Here, the maximum of "n" (i.e., n_max) corresponds to the number of kinds (i.e., levels) of velocity of the ball object that the pitcher character is capable of releasing. For example, as illustrated in FIG. 4, when the pitcher character is capable of releasing a slow ball of 105 km/h, a curveball of 120 km/h, a screwball of 120 km/h, and a fastball of 150 km/h (=V_max), the number of levels n_max of the ball object's velocity is set to be "3" by the CPU 7. In this case, the following relation is established: "n_max=3". Accordingly, the ball object's velocity data BT (n) corresponds to "BT(1)=105 (km)", "BT (2)=120 (km)", and "BT (3)=150 (km)".

Next, processing of associating the batter character's velocity adaptability data DT (V (m)) with the ball object's velocity data BT (n) is executed by the CPU 7 (Step S406). Specifically, the ball object's velocity data BT (n) is considered as the ball object's velocity V (m), and accordingly the batter character's velocity adaptability data DT (V (m)) corresponding to the ball object's velocity data BT (n) is evaluated. In other words, as illustrated in FIG. 4, it is also possible to evaluate the batter character's velocity adaptability data DT (V (m)) corresponding to the ball object velocity data BT (n) as "DT (BT (n))".

As described above, the CPU 7 is caused to evaluate the batter character's velocity adaptability data DT (V (m)) corresponding to the ball object's velocity data BT (n) with "DT (BT (n))", and accordingly the CPU 7 is caused to associate the ball object's velocity data BT (n) with the batter character's velocity adaptability data DT (V (m)).

Figure 5A:
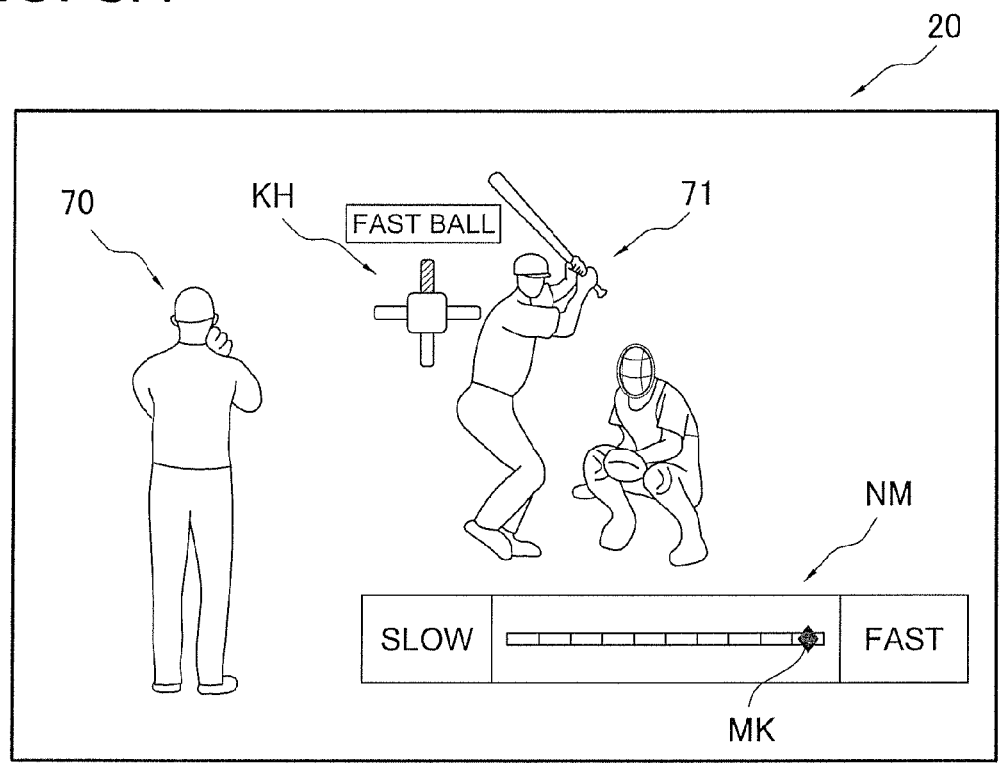
FIGS. 5(a) and 5(b) are diagrams for explaining overview of an ability indicator.
Figure 5B:
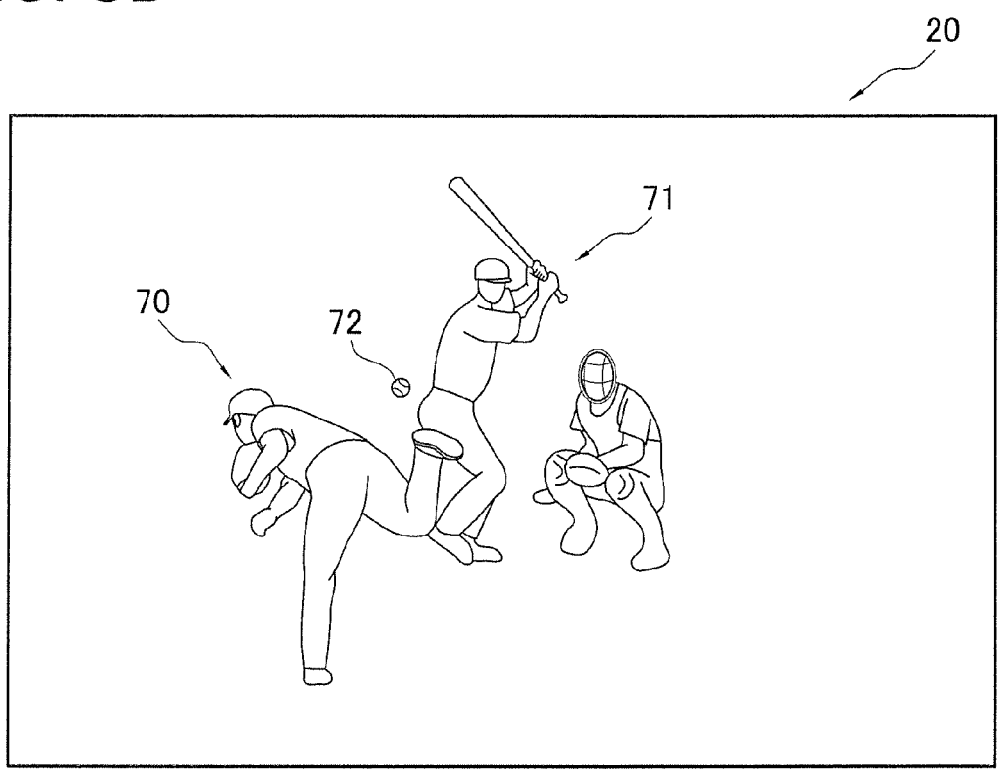

When the batter character's velocity adaptability data DT (V (m)) and the ball object's velocity data BT (n) were recognized and associated by the CPU 7 as described above, a variety of basic images are displayed on the television monitor 20 with corresponding image data as illustrated in FIG. 5 (Step S407). For example, a pitcher character 70, a batter character 71, and a fielder character (not illustrated in the figure) are displayed on the television monitor 20 with the corresponding image data. Also, a pitch informing image KH is displayed on the television monitor 20 with the corresponding image data. Here, the pitch informing image KH is displayed for informing a game player of a pitch that the pitcher character 70 is capable of releasing. Furthermore, a ball-hitting zone (not illustrated in the figure) is displayed on the television monitor 20 with the corresponding image data. Here, the batter character 71 is capable of hitting the ball object when the ball object exists in the ball-hitting zone.

Next, a velocity ability indicator NM is displayed on the television monitor 20 with the corresponding image data (Step S408). Here, the velocity ability indicator NM is displayed for informing a game player of velocity adaptability of the batter character 71. For example, the velocity ability indicator NM is displayed on the television monitor 20 with the corresponding image data based on the velocity adaptability data DT (V (m)) of the batter character 71.

Here, the velocity ability indicator NM is formed in a rectangular shape. Also, the velocity ability indicator NM is sectioned in ten portions corresponding to levels 1 to 10. The velocity adaptability level of the batter character 71 is expressed by the thickness of the sectioned portion. As illustrated in FIG. 5, the velocity ability indicator NM has constant thickness in the initial state. In the initial state of the velocity ability indicator NM, the velocity adaptability data DT (V (m)) of the batter character 71 of each level is set to be "$DT_0$" (=1.0) as a benchmark.

In the condition, when a game player pressed a direction key of the controller 17 (i.e., the up key 17U, the down key 17D, the left key 17L, and the right key 17R) while watching the pitch informing image KH displayed on the television monitor 20, a pitch assigned to the pressed direction key is selected (Step S409).

As illustrated in FIG. 5, the pitch informing image KH is formed in a cross shape. When the up key 17U of the controller 17 was pressed, an upper protruding portion of the pitch informing image KH is highlighted and characters "FASTBALL" are displayed in the vicinity of the upper protruding portion. In other words, a fastball is assigned to the up key 17U of the controller 17.

Also, when the left key 17L of the controller 17 was pressed, a left protruding portion of the pitch informing image KH is highlighted and characters "CURVEBALL" are displayed in the vicinity of the left protruding portion. In other words, a curveball is assigned to the left key 17L of the controller 17.

Also, when the right key 17R of the controller 17 was pressed, a right protruding portion of the pitch informing image KH is highlighted and characters "SCREWBALL" are displayed in the vicinity of the right protruding portion. In other words, a screwball is assigned to the right key 17R of the controller 17.

Furthermore, when the down key 17D of the controller 17 was pressed, a lower protruding portion of the pitch informing image KH is highlighted and characters "SLOW BALL" are displayed in the vicinity of the lower protruding portion. In other words, a slow ball is assigned to the down key 17U of the controller 17.

When the controller 17 is thus operated, the pitch selected through the controller 17 and the velocity of the pitch selected through the controller 17 are recognized by the CPU 7. For example, the pitch data corresponding to the pitch selected through the controller 17 and the ball object's velocity data BT (ns) corresponding to the ball object's velocity assigned to the selected pitch are recognized by the CPU 7 (Step S410). Here, "ns" corresponds to a level for determining the ball object's velocity to be determined when a pitch is selected.

For example, FIG. 4 illustrates that the pitcher character 70 is capable of releasing a slow ball of 105 km/h, a curveball of 120 km/h, a screwball of 120 km/h, and a fastball of 150 km/h (=V_max). When the slow ball is selected, "n=1 (=ns)" is recognized by the CPU 7, and accordingly the ball object's velocity data BT (1) (=105 (km/h)) is recognized by the CPU 7. Also, when the curveball or the screwball is selected, "n=2 (=ns)" is recognized by the CPU 7, and accordingly the ball object's velocity data BT (2) (=120 (km/h)) is recognized by the CPU 7. Furthermore, when the fastball is selected, "n=3 (=ns)" is recognized by the CPU 7, and accordingly the ball object's velocity data BT (3) (=150 (km/h)) is recognized by the CPU 7.

Next, the velocity adaptability data DT (V (ms)) of the batter character 71 (=DT (BT (ns))) is recognized by the CPU 7 (see FIG. 4). Here, the velocity adaptability data DT (V (ms)) corresponds to the ball object's velocity data BT (ns) recognized by the CPU 7. Accordingly, a level "ms" corresponding to the velocity adaptability data DT (V (ms)) is recognized by the CPU 7 (Step S411, see FIG. 3). Here, "ms" indicates a level for determining the velocity adaptability data DT (V(ms)).

Then, a mark MK is displayed on the television monitor 20 with mark's image data (Step S412). Here, the mark MK is used for informing a game player of the level ms of the velocity adaptability data DT (V(ms)) of the batter character 71. For example, the mark MK is displayed on the velocity ability indicator NM (see FIG. 5). Accordingly, a game player is capable of selecting a desired pitch while referring to the mark MK.

For example, when the pitcher character 70 is capable of releasing a slow ball of 105 km/h, a curveball of 120 km/h, a screwball of 120 km/h, and a fastball of 150 km/h (=V_max) and the slow ball is selected, the velocity adaptability data DT (V (1)) of the batter character 71 (=DT (BT (1))=105) is recognized by the CPU 7. Accordingly, the level "ms=1" corresponding to the velocity adaptability data DT (V (1)) of the batter character 71 is recognized by the CPU 7. Then, the mark MK for informing a game player of velocity adaptability of the batter character 71 is displayed on a portion "level 1" of the velocity ability indicator NM.

Also, when the curveball or the screwball is selected, the velocity adaptability data DT (V (4)) of the batter character 71 (=DT (BT (2))=120) is recognized by the CPU 7. Then, the level "ms=4" corresponding to the velocity adaptability data DT (V (4)) of the batter character 71 is recognized by the CPU 7. Accordingly, the mark MK for informing a game player of velocity adaptability of the batter character 71 is displayed on a portion "level 4" of the velocity ability indicator NM.

Furthermore, when the fastball is selected, the velocity adaptability data DT (V (10)) of the batter character 71 (=DT (BT (3))=150) is recognized by the CPU 7. Accordingly, the level "ms=10" corresponding to the velocity adaptability data DT (V (10)) of the batter character 71 is recognized by the CPU 7. As illustrated in FIG. 5, the mark MK for informing a game player of velocity adaptability of the batter character 71 is then displayed on a portion "level 10" of the velocity ability indicator.

In the selection of a pitch, the mark MK is thus allowed to be displayed on the velocity ability indicator NM. Therefore, a game player is capable of confirming a batter character 71's accustomed ball object's velocity level by watching the thickness of the mark MK. At the same time as this, the game player is capable of recognizing his/her currently selecting pitch's velocity with the mark MK. Accordingly, a game player is capable of easily comparing the batter character's accustomed ball object's velocity with his/her currently selecting pitch's velocity. As a result, a game player is capable of promptly selecting velocity of the ball object to be released by the pitcher character 70 without an erroneous operation.

Next, when a game player operated a predetermined button of the controller 17 in the above-mentioned condition, a command for a pitching motion is given to the pitcher character 70 (Step S413). The command for a pitching motion is issued by the CPU 7, and includes a command for causing the pitcher character 70 to start a pitching motion, a command for determining a pitching trajectory, a command for causing the pitcher character 70 to release the ball object, and the like. Accordingly, a series of pitching motions of the pitcher character 70 are displayed on the television monitor 20. Then, the ball object 72 released by the pitcher character 70 is displayed on the television monitor 20 as illustrated in FIG. 5 (Step S414). When the ball object 72 released by the pitcher character 70 was displayed on the television monitor 20, a command for clearing the velocity ability indicator NM is issued by the CPU 7. Accordingly, the currently displayed velocity ability indicator NM is cleared from the screen of the television monitor 20 (Step S415). In this condition, the pitch informing image KH is not displayed on the television monitor 20.

Next, it is judged by the CPU 7 whether or not a command for batting was given to the batter character 71 based on the AI program (Step S416). The command for batting includes a command for moving the ball-hitting zone and a command for causing the batter character 71 to start swinging a bat.

Then, when it was judged by the CPU 7 that the command for batting was given to the batter character 71 based on the AI program (Yes in Step S416), a series of swinging motions of the batter character 71 are displayed on the television monitor 20.

Also, when the command for causing the batter character 71 to start swinging was given based on the AI program (Yes in S416), it is judged by the CPU 7 whether or not the ball object was hit by the batter character 71 (Step S417). For example, it is judged by the CPU 7 whether or not the ball-hitting zone was overlapped with the ball object. Specifically, it is judged by the CPU 7 whether or not at least one coordinate data within the ball-hitting zone was matched with at least one coordinate data within the ball object.

Then, when it was judged by the CPU 7 that the ball object was not hit by the batter character 71 (No in Step S417), in other words, when the ball object reached the position of a catcher character's mitt, processing for changing velocity adaptability of the batter character 71 is executed by the CPU 7. For example, processing for incrementing change frequency data ih (m) is executed by the CPU 7 (Step S418). Here, the change frequency data ih (m) corresponds to change frequency of velocity adaptability of the batter character 71. The processing is expressed by the equation: "ih (m)=ih (m)+1". Then, the processed change frequency data ih (m) is recognized by the CPU 7.

Accordingly, the weighted data DW (ih (m)) corresponding to the change frequency data ih (m) is recognized by the CPU 7 based on a correspondence table for indicating correspondence relation between the change frequency data ih (m) and the weighted data DW (ih (m)) (Step S419). FIG. 6 illustrates an example of the correspondence table, and the correspondence table is preliminarily determined in the game program.

Here, the change frequency data ih (m) corresponds to frequency that the batter character 71 encounters the ball object of the same velocity. In the real baseball video game, the more a batter encounters balls of the same velocity, the more the batter easily adapts oneself to the ball velocity. For the purpose of replicating this effect in the baseball video game, the value of the weighted data DW (ih (m)) is increased as the value of the change frequency data ih (m) is increased. This is illustrated in FIG. 6. Accordingly, the more the batter character 71 encounters the ball objects of the same velocity, the more the batter character 71 easily adapts oneself to the ball object's velocity.

Then, the velocity adaptability data DT (V (m)) of the batter character 71 is changed by the CPU 7 depending on the ball object's velocity data BT (ns) recognized by the CPU 7 (Step S420). For example, the batter character 71's velocity adaptability data DT (V (ms)) (i.e., main-velocity adaptability data) corresponding to the ball object's velocity data BT (ns) recognized by the CPU 7 is changed by the CPU 7 in consideration of the weighted data DW (ih (m)) corresponding to the change frequency data ih (m). The batter character 71's velocity adaptability data DT (V (mf)) of the other levels (i.e., sub-velocity adaptability data) excluding the batter character 71's main-velocity adaptability data DT (V (ms)) is changed by the CPU 7 based on the batter character 71's main-velocity adaptability data DT (V (ms)). Here, "mf" is natural number ranging from 1 to m_max (excluding "ms").

The following example explains that the batter character 71's velocity adaptability data (i.e., the main-adaptability data and the sub-adaptability data) is changed.

For example, the batter character 71's main-velocity adaptability data DT (V (ms)) is changed by the CPU 7 with the equation "DT (V (ms))=DT (V (ms))+DW (ih (ms))×k". On the other hand, the batter character 71's sub-velocity adaptability data DT (V (mf)) is changed by the CPU 7 with the equation "DT (V (mf))=DT (V (mf))+(K−|ms−mf|×kc)". Here, "k" is correction coefficient for correcting the batter character 71's main-velocity adaptability data. On the other hand, "kc" is correction coefficient for correcting the batter character 71's sub-velocity adaptability data based on the main-velocity adaptability data of the batter character 71. Also, "k" and "kc" are constant numbers. In this case, "k" and "kc" are respectively set to be "1.0" and "0.25".

When the batter character 71's velocity adaptability data is thus changed by the CPU 7, it is judged by the CPU 7 whether or not a match-up between the pitcher character 70 and an arbitrary batter character 71 was finished (Step S421). For example, it is herein judged by the CPU 7 whether or not a flag for indicating finish of the match-up between the pitcher character 70 and the batter character 71 was turned on. In other words, it is judged by the CPU 7 whether or not the flag value is "1".

Then, when it was judged by the CPU 7 that the match-up between the pitcher character 70 and the batter character 71 had not finished yet, in other words, when the flag value is not "1" but "0" (No in Step S421), the changed batter character 71's velocity adaptability data of each level (i.e., main-velocity adaptability data and sub-velocity adaptability data) is re-recognized by the CPU 7 (Step S422). Accordingly, in Step S408, the velocity ability indicator NM for informing a game player of the batter character 71's velocity adaptability is redisplayed on the television monitor 20 with the ability indicator's image data based on the changed batter character 71's velocity adaptability data of each level (i.e., the main-velocity adaptability data and the sub-velocity adaptability data).

On the other hand, when it was judged by the CPU 7 that the ball object was hit by the batter character 71 (Yes in S417), processing for incrementing the change frequency data ih (m) corresponding to the change frequency of the batter character 71's velocity adaptability data will not be executed by the CPU 7. In addition, processing for changing the batter character 71's velocity adaptability data will not be executed by the CPU 7. In this case, processing in Step S421 is executed by the CPU 7.

Also, when a command for causing the batter character 71 to start a swinging motion was not given based on the AI program (No in Step S416), a series of swinging motions of the batter character 71 are not displayed on the television monitor 20. This corresponds to a case that the batter character 71 did not swing a bat. Also, in this case, processing for incrementing the change frequency data ih (m) corresponding to change frequency of the batter character 71's velocity adaptability data is executed by the CPU 7 when the ball object reaches the position of the catcher character's mitt (Step S418). Then, the processed change frequency data ih (m) is recognized by the CPU 7.

Next, the above-mentioned Steps S419 and S420 are performed by the CPU 7. Accordingly, the batter character 71's main-velocity adaptability data is changed by the CPU 7 in consideration of the weighted data DW (ih (m)) corresponding to the change frequency data ih (m). Also, excluding the main-velocity adaptability data of the batter character 71, the batter character 71's sub-velocity adaptability data is changed by the CPU 7 based on the batter character 71's main-velocity adaptability data. Accordingly, subsequent processing after the above-mentioned Step S421 are executed by the CPU 7.

Next, when it was judged by the CPU 7 that the match-up between the pitcher character 70 and an arbitrary batter character 71 was finished, in other words, when the flag value is "1" (Yes in Step S421), the batter character 71's velocity adaptability data of each level is reset by the CPU 7 (Step S423). In other words, the batter character 71's velocity adaptability data of each level is changed into the default value $DT_0$ by the CPU 7.

Next, it is judged by the CPU 7 whether or not the game event was finished (Step S424). For example, it is judged by the CPU 7 whether or not a flag for indicating finish of the game event is turned on. In other words, it is judged by the CPU 7 whether or not the flag value is "1".

Next, when it was judged by the CPU 7 that the game event had not finished yet, in other words, when the flag value is not "1" but "0" (No in Step S424), processing in Step S404 with respect to the next batter character 71 is executed again by the CPU 7. On the other hand, when it was judged by the CPU 7 that the game event was finished, in other words, when the flag value is "1" (Yes in Step S424), processing for finishing the game event (e.g., processing for storing a variety of data in the RAM 12) is executed by the CPU 7 (Step S425).

Finally, the ability indicator NM will be hereinafter explained in detail with reference to FIG. 7. Note that the mark MK is not illustrated in FIG. 7 for better view of the ability indicator NM.

Figure 7A:
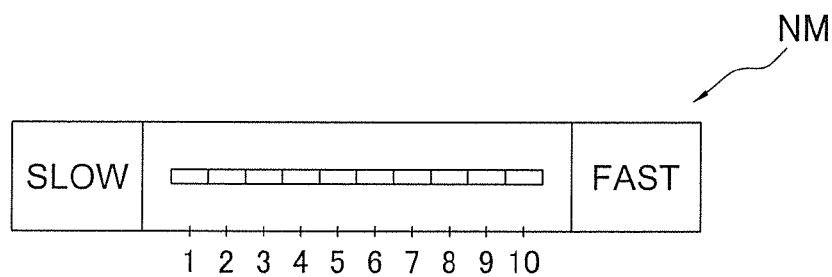
FIGS. 7(a) to 7(c) are diagrams for illustrating detail of the ability indicator.

As illustrated in FIGS. 5 and 7(a), the ability indicator NM displayed on the television monitor 20 has constant thickness in the default state. In this case, the batter character 71's velocity adaptability data DT (V (m)) of each level is set to be "$DT_0$" (=1.0). In other words, when the velocity adaptability data DT (V (m)) is "$DT_0$" (=1.0), the constant-thickness ability indicator NM is displayed on the television monitor 20 as illustrated in FIGS. 5 and 7(a).

On the other hand, when the velocity adaptability data DT (V (m)) is changed, value of the velocity adaptability data DT (V (m)) becomes greater than or less than "$DT_0$" (=1.0). Accordingly, as illustrated in FIGS. 7(b) and 7(c), thickness of the ability indicator NM displayed on the television monitor 20 is changed depending on the changed velocity adaptability data DT (V (m)).

Figure 7B:
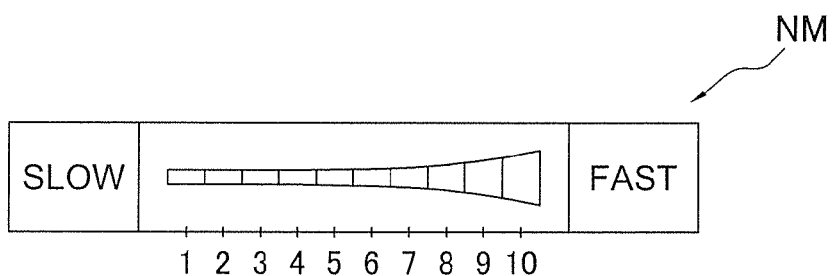

In the example of FIG. 7(b), the velocity adaptability data DT (V (m)) is changed when fastballs of 150 km/h (m=10) are successively released three times. In FIG. 7(b), the batter character 71 came to be used to the fastball of 150 km/h, and a portion of the ability indicator corresponding to the level 10 reflects its influence. When a game player watches the ability indicator illustrated in FIG. 7(b), he/she is capable of confirming that the batter character 71 is accustomed to the fastball of 150 km/h.

In other words, FIG. 7(b) indicates that the batter character 71 hits the ball object with high possibility when the pitcher character 70 releases the ball object of approximately 150 km/h in the next at-bat. Therefore, a game player is capable of judging that the pitcher character 70 has greater risk of being got hammered when releasing the ball object of the velocity level corresponding to the ability indicator NM's thicker portion. In general, the more the ball velocity becomes fast, the more the pitcher character 70 becomes advantageous over the batter character 71. However, a game player may choose a strategy for causing the pitcher character to throw a slow ball based on the above-mentioned information. Thus, the present baseball video game is provided with useful information for a pitching plan while the conventional baseball video games have not been provided with the information. Accordingly, the present baseball video game is capable of highly entertain a game player.

Figure 7C:
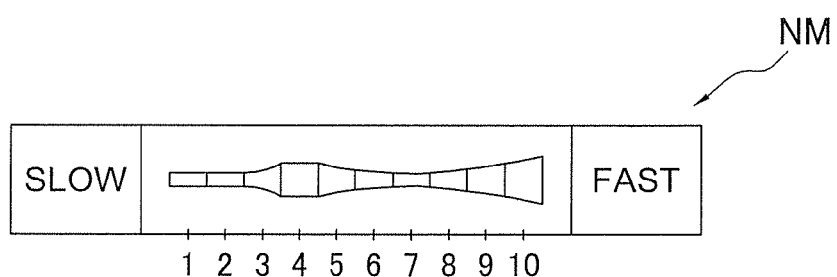

Also, in the example of FIG. 7(c), the velocity adaptability data DT (V (m)) is changed when the pitcher character 70 released a curveball of 120 km/h (m=4) after consecutively releasing fastballs of 150 km/h (m=10) three times. In FIG. 7(c), the batter character 71 came to be used to a curveball of 120 km/h, and a "level 4" portion of the ability indicator reflects its influence. In addition, the batter character 71 also came to be used to a fastball of 150 km/h, and a "level 10" portion of the ability indicator reflects its influence. Thus, before the match-up between the pitcher character 70 and the batter character 71 is finished, the ability indicator is configured to reflect influence of the immediately-preceding ball object's velocity and is also configured to keep influence of the past-released ball object's velocity. When a game player watches the ability indicator illustrated in FIG. 7(c), he/she is capable of confirming that the batter character 71 is accustomed to the ball object of 120 km/h and is still accustomed to the ball object of 150 km/h.

Thus, according to the present embodiment, the ability indicator is configured to reflect the batter character 71's velocity adaptability data for the past pitching results based on the change frequency ih (m) of the velocity adaptability data and the weighted data DW (ih (m)) corresponding to the change frequency. Therefore, it is possible to visually express the remaining influence of the past released ball experienced by a real baseball's batter in the video game.

Thus, according to the present embodiment, the ability indicator is configured to inform a game player of the batter character 71's velocity adaptability for the ball object's velocity from the start till the end of the match-up between the pitcher character 70 and the batter character 71. Based on the information of the ability indicator NM, a game player is capable of giving the pitcher character 70 a command of pitching. Then, a game player is capable of effectively obtaining a pitching method for a pitcher character. Accordingly, a game player is able to effectively make a batter character out, and further enjoys amusement of the baseball video game. Furthermore, a game player is capable of experiencing a feeling of a real baseball's pitcher in the baseball video game.

Other Example Embodiment (a) In the above-mentioned embodiment, the home video game device is used as an example of a computer that the game program is allowed to be applied. However, the game device is not limited to the above-mentioned embodiment. The game device may be applied to a game device that a monitor is separately provided, a monitor-integrated game device, a personal computer or a workstation functioning as a game device when a game program is executed therein, and the like, as well.

(b) The present invention includes a program for executing the above-mentioned game and a computer-readable recording medium storing the program. For example, a computer-readable flexible disk, a semiconductor memory, a CD-ROM, a DVD, a MO, and a ROM cassette may be suggested as the recording medium other than the cartridge.

(c) In the above-mentioned embodiment, the velocity data relating to the ball object's velocity is used as the ball object's property data. However, the ball object's property data is not limited to the above-mentioned embodiment, and may be any type of data as long as the data relates to a ball object's property. For example, variation data relating to the ball object's variation may be used instead of the ball object's velocity data. Also, both of the ball object's velocity data and the ball object's variation data may be used.

In this case, the television monitor 20 displays an ability indicator for informing a game player of batter character's variation adaptability, that is, an ability indicator for informing a game player of batter character's adaptability for breaking-ball. Therefore, a game player is capable of evaluating the batter character's variation adaptability and effectively giving a pitcher character a command while watching the ability indicator. Accordingly, a game player is capable of effectively acquiring a pitching method. Furthermore, a game player is capable of realistically having a feeling of a real baseball's pitcher.

General Interpretation

As used herein, the following directional terms "forward, rearward, above, downward, vertical, horizontal, below and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device includes hardware and/or software that is constructed and/or programmed to carry out the desired function.

Terms that are expressed as "means-plus function" in the claims should include any structure that can be utilized to carry out the function of that part of the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A non-transitory computer readable medium storing a computer program for a baseball video game in which a user instructs to release a moving object from a first character to a second character, the first character being a pitcher, the second character being a batter, the computer program comprising:
   code for displaying the first character and the second character on an image display unit;
   code for recognizing property data of the second character corresponding to a property of the second character with regards to speed of the moving object;
   code for recognizing property data of the moving object corresponding to a property of the moving object with regards to speed of the moving object which is released by the first character;
   code for informing the property of the second character to the user based on the property data of the second character by displaying a property indicator on the image display unit, the property indicator being arranged to extend and shrink in a first direction in order to show the speed; and
   code for displaying the property indicator on the image display unit, the property indicator being fatter in a second direction perpendicular to the first direction as the property data of the second character increases.

2. The non-transitory computer readable medium according to claim 1, the computer program further comprising
   code for changing the property data of the second character based on the property data of the moving object; and
   code for re-recognizing the property data of the second character after being changed; and
   code for changing the property data of the second character to between the property data of the second character for the current time and the property data of the second character for the last time, if the speed of the moving object for a current time is different from a last time.

3. The non-transitory computer readable medium according to claim 2, the computer program further comprising
   code for displaying a mark, which is assigned for a kind of pitch, at a place corresponding to the kind of pitch on the property indicator to inform the speed of the moving object to the user.

4. The non-transitory computer readable medium according to claim 2, the computer program further comprising
   code for recognizing a number of times for changing the property of the second character; and
   code for changing the property data of the second character based on the property data of the moving object and weight data corresponding to the number of times, after displaying the moving object released from the first character.

5. The non-transitory computer readable medium according to claim 2, the computer program further comprising
   code for recognizing the property data of the second character which includes a plurality of levels with regards to the ability for adapting to the speed;
   code for recognizing one of the plurality of levels;
   code for changing the property data of the second character based on the property data of the moving object, after the moving object released from the first character; and
   code for changing a part of the property of the second character corresponding to the one of the plurality levels, after the moving object released from the first character; and code for changing the property data of the second character other than the part based on the one of the plurality of levels as reference.

6. The non-transitory computer readable medium according to claim 5, the computer program further comprising
   code for setting the plurality of levels greater than the property data of the moving object which correspond to the plurality of levels.

7. A game device for a baseball video game in which a user instructs to release a moving object from a first character to a second character, the first character being a pitcher, the second character being a batter, the game device comprising:
   character display means for displaying the first character and the second character on an image display unit;
   character property recognition means for recognizing property data of the second character corresponding to a property of the second character with regards to speed of the moving object;
   moving object property recognition means for recognizing property data of the moving object corresponding to a property of the moving object with regards to speed of the moving object which is released by the first character;
   character property display means for informing the user of the property of the second character based on the property data of the second character by displaying a property indicator on the image display unit, the property indicator being arranged to extend and shrink in a first direction in order to show the speed; and
   character property redisplay means for displaying the property indicator on the image display unit, the property indicator being fatter in a second direction perpendicular to the first direction as the property data of the second character increases.

8. A method for controlling a baseball video game in which a user instructs to release a moving object from a first character to a second character, the first character being a pitcher, the second character being a batter, the computer program comprising:
   displaying the first character and the second character on an image display unit;
   recognizing property data of the second character corresponding to a property of the second character with regards to speed of the moving object;
   recognizing property data of the moving object corresponding to a property of the moving object with regards to speed of the moving object which is released by the first character;
   informing the user of the property of the second character based on the property data of the second character by displaying a property indicator on the image display unit, the property indicator being arranged to extend and shrink in a first direction in order to show the speed; and
   displaying the property indicator on the image display unit, the property indicator being fatter in a second direction perpendicular to the first direction as the property data of the second character increases.

9. A non-transitory computer readable medium storing a computer program for a video game in which a user instructs to release a moving object from a first character to a second character, the computer program comprising:
   code for displaying the first character and the second character on an image display unit;
   code for recognizing property data of the second character corresponding to a property of the second character with regards to speed of the moving object;

code for recognizing property data of the moving object corresponding to a property of the moving object with regards to speed of the moving object which is released by the first character;
code for informing the property of the second character to the user based on the property data of the second character by displaying a property indicator on the image display unit; and
code for displaying the property indicator on the image display unit, the property indicator being fatter as the property data of the second character increases;
code for changing the property data of the second character based on the property data of the moving object;
code for re-recognizing the property data of the second character after being changed;
code for changing the property data of the second character to between the property data of the second character for the current time and the property data of the second character for the last time, if the speed of the moving object for a current time is different from a last time;
code for recognizing the property data of the second character which includes a plurality of levels with regards to the ability for adapting to the speed;
code for recognizing one of the plurality of levels;
code for changing the property data of the second character based on the property data of the moving object, after the moving object released from the first character; and
code for changing a part of the property of the second character corresponding to the one of the plurality levels, after the moving object released from the first character; and code for changing the property data of the second character other than the part based on the one of the plurality of levels as reference.

* * * * *